(12) United States Patent
Koka et al.

(10) Patent No.: US 8,473,659 B2
(45) Date of Patent: Jun. 25, 2013

(54) TIME DIVISION MULTIPLEXING BASED ARBITRATION FOR SHARED OPTICAL LINKS

(75) Inventors: Pranay Koka, Austin, TX (US); Michael Oliver McCracken, Austin, TX (US); Herbert Dewitt Schwetman, Jr., Austin, TX (US); Xuezhe Zheng, San Diego, CA (US); Ashok Krishnamoorthy, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 737 days.

(21) Appl. No.: 12/688,749

(22) Filed: Jan. 15, 2010

(65) Prior Publication Data

US 2011/0179208 A1  Jul. 21, 2011

(51) Int. Cl.
*G06F 13/372* (2006.01)

(52) U.S. Cl.
USPC ............................ 710/124; 710/117; 710/316

(58) Field of Classification Search
USPC .. 710/117, 124, 316, 317, 240–244; 370/458, 370/461, 462, 468; 398/68, 69, 75, 141, 165
See application file for complete search history.

(56) References Cited

U.S. PATENT DOCUMENTS

| | | | |
|---|---|---|---|
| 4,535,330 A * | 8/1985 | Carey et al. | 710/116 |
| 4,580,872 A | 4/1986 | Bhatt et al. | |
| 4,809,264 A | 2/1989 | Abraham et al. | |
| 5,541,914 A | 7/1996 | Krishnamoorthy et al. | |
| 5,602,663 A * | 2/1997 | Hamaguchi et al. | 398/79 |
| 5,742,585 A | 4/1998 | Yamamoto et al. | |
| 5,943,150 A | 8/1999 | Deri et al. | |
| 6,021,263 A | 2/2000 | Kujoory et al. | |
| 6,289,021 B1 | 9/2001 | Hesse | |
| 6,487,643 B1 * | 11/2002 | Khare et al. | 711/150 |
| 6,618,379 B1 * | 9/2003 | Ramamurthy et al. | 370/395.41 |
| 6,633,542 B1 | 10/2003 | Natanson et al. | |
| 6,665,495 B1 | 12/2003 | Miles et al. | |
| 6,873,796 B1 | 3/2005 | Nakahira | |
| 6,910,088 B2 * | 6/2005 | LaBerge | 710/117 |
| 7,403,473 B1 | 7/2008 | Mehrvar et al. | |
| 7,804,504 B1 | 9/2010 | Agarwal | |
| 8,014,671 B1 * | 9/2011 | Stevens | 398/69 |
| 2003/0214962 A1 | 11/2003 | Allaye-Chan et al. | |
| 2004/0037558 A1 | 2/2004 | Beshai | |
| 2006/0095634 A1 * | 5/2006 | Meyer | 710/309 |
| 2009/0046572 A1 | 2/2009 | Leung | |

(Continued)

OTHER PUBLICATIONS

Silicon Nanophotonic Network-On-Chip Using TDM Arbitration, Hendry et al., undated.*

(Continued)

*Primary Examiner* — Khanh Dang
(74) *Attorney, Agent, or Firm* — Osha Liang LLP

(57) ABSTRACT

A method for arbitration including selecting, for an arbitration interval corresponding to a timeslot, a sending node from a plurality of sending nodes in an arbitration domain, where the plurality of sending nodes include a plurality of source counters; broadcasting, by the sending node and in response to selecting the sending node, a transmitter arbitration request for the timeslot during the arbitration interval; receiving, by the plurality of sending nodes, the transmitter arbitration request; incrementing the plurality of source counters in response to receiving the transmitter arbitration request; and sending, during the timeslot, a data item from the sending node to a receiving node via an optical data channel.

19 Claims, 15 Drawing Sheets

U.S. PATENT DOCUMENTS

| | | | |
|---|---|---|---|
| 2009/0168782 A1* | 7/2009 | Beshai | 370/395.4 |
| 2009/0169205 A1* | 7/2009 | Bergman et al. | 398/45 |
| 2011/0103397 A1* | 5/2011 | Koka et al. | 370/458 |
| 2011/0103799 A1 | 5/2011 | Shacham et al. | |
| 2011/0200332 A1* | 8/2011 | McCracken et al. | 398/52 |
| 2011/0200335 A1* | 8/2011 | Koka et al. | 398/98 |
| 2011/0206377 A1* | 8/2011 | Binkert et al. | 398/83 |

OTHER PUBLICATIONS

Photonic Multihop Bus Networks, Todd et al., IEEE 1991.*

Round Robin Scheduling, <http://en.wikipedia.org/wiki/Round-robin_scheduling>, accessed Sep. 15, 2011.*

Vantrease, D., et al., "Corona: System Implications for Emerging Nanophotonic Technology", International Symposium on Computer Architecture, IEEE, Jun. 2008, 12 pages.

Wang, H., et al, "Nanophotonic Optical Interconnection Network Architecture for On-Chip and Off-Chip Communications", OFC/NFOEC Feb. 2008, IEEE, 3 pages.

Krishnamoorthy, A.V., Ho, R., Zheng, X., Schwetman, H., Lexau, J., Koka, P., Li, G., Shubin I., Cunningham, J. E., "Computer Systems Based on Silicon Photonic Interconnects", Proceedings of the IEEE, vol. 97, No. 7, Jul. 2009, 25 pages.

Chae, C., Wong, E., and Tucker, R. S., "Optical CSMA/CD Media Access Scheme for Ethernet Over Passive Optical Network", IEEE Photonic Technology Letters, May 2002, 3 pages.

Desai, B. N., "An Optical Implementation of a Packet-Based (Ethernet) MAC in a WDM Passive Optival Network Overlay", Mar. 2001, 3 pages.

Qin, X., and Yang, Y., "Nonblocking WDM Switching Networks with Full and Limited Wavelength Conversion", IEEE Transactions on Communications, Dec. 2002, 10 pages.

Shacham, A., Bergman, K., and Carloni, L. P., "On the Design of a Photonic Network-on-Chip", First International Symposium on Networks-on-Chip, May 2007, 12 pages.

Yang, Y., and Wang, J., "Designing WDM Optical Interconnects with Full Connectivity by Using Limited Wavelength Conversion", IEEE Transactions on Computers, Dec. 2004, 10 pages.

Batten, C., et al., "Building Manycore Processor-to-DRAM Networks with Monolithic Silicon Photonics", Proceedings of the 16th Symposium on High Performance Interconnects (HOTI-16) Aug. 2008, 10 pages.

* cited by examiner

TIME DIVISION MULTIPLEXING BASED ARBITRATION FOR SHARED OPTICAL LINKS

STATEMENT REGARDING FEDERALLY SPONSORED RESEARCH OR DEVELOPMENT

This invention was made with Government Support under Agreement No. HR0011-08-9-0001 awarded by DARPA. The Government has certain rights in the invention.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place a different set of constraints on designers. For example, because each processor may be working on an independent task, more requests to memory, or other processors, may need to be issued. It may also be necessary to share information among the processors. Accordingly, the input/output ("I/O") bandwidth requirements for a system with multiple processors may be much higher than for a single processor system.

SUMMARY

In general, in one aspect, the invention related to a method for arbitration. The method comprises: selecting, for an arbitration interval corresponding to a timeslot, a sending node from a plurality of sending nodes in an arbitration domain, wherein the plurality of sending nodes comprises a plurality of source counters; broadcasting, by the sending node and in response to selecting the sending node, a transmitter arbitration request for the timeslot during the arbitration interval; receiving, by the plurality of sending nodes, the transmitter arbitration request; incrementing the plurality of source counters in response to receiving the transmitter arbitration request; and sending, during the timeslot, a data item from the sending node to a receiving node via an optical data channel.

In general, in one aspect, the invention related to a system for arbitration. The system comprises: a sending node selected from a plurality of sending nodes having a plurality of source counters, wherein the sending node is configured to broadcast a transmitter arbitration request and a receiver arbitration request during an arbitration interval; a receiving node having a destination counter and configured to receive a data item from the sending node during a timeslot corresponding to the arbitration interval and commencing after completion of the arbitration interval; an optical data channel configured to propagate the data item between the sending node and the receiving node; a first optical arbitration link (OAL) configured to propagate the transmitter arbitration request to the plurality of sending nodes; a second OAL configured to propagate the receiver arbitration request from the sending node; and a third OAL operatively connected to the second OAL and configured to propagate the receiver arbitration request to the receiving node, wherein the plurality of source counters increment in response to the plurality of sending nodes receiving the transmitter arbitration request, and wherein the destination counter increments in response to the receiving node receiving the receiver arbitration request.

In general, in one aspect, the invention relates to a macrochip. The macrochip comprises: a sending node selected from a plurality of sending nodes having a plurality of source counters, wherein the sending node is configured to broadcast a transmitter arbitration request and a receiver arbitration request during an arbitration interval; a receiving node having a destination counter and configured to receive a data item from the sending node during a timeslot corresponding to the arbitration interval and commencing after completion of the arbitration interval; and a silicon photonic network (SPN) configured to propagate the transmitter arbitration to the plurality of sending nodes, the receiver arbitration request to the receiving node, and the data item to the receiving node, wherein the plurality of source counters increment in response to the plurality of sending nodes receiving the transmitter arbitration request, and wherein the destination counter increments in response to the receiving node receiving the receiver arbitration request.

Other aspects of the invention will be apparent from the following description and the appended claims.

DETAILED DESCRIPTION

Figure 1:
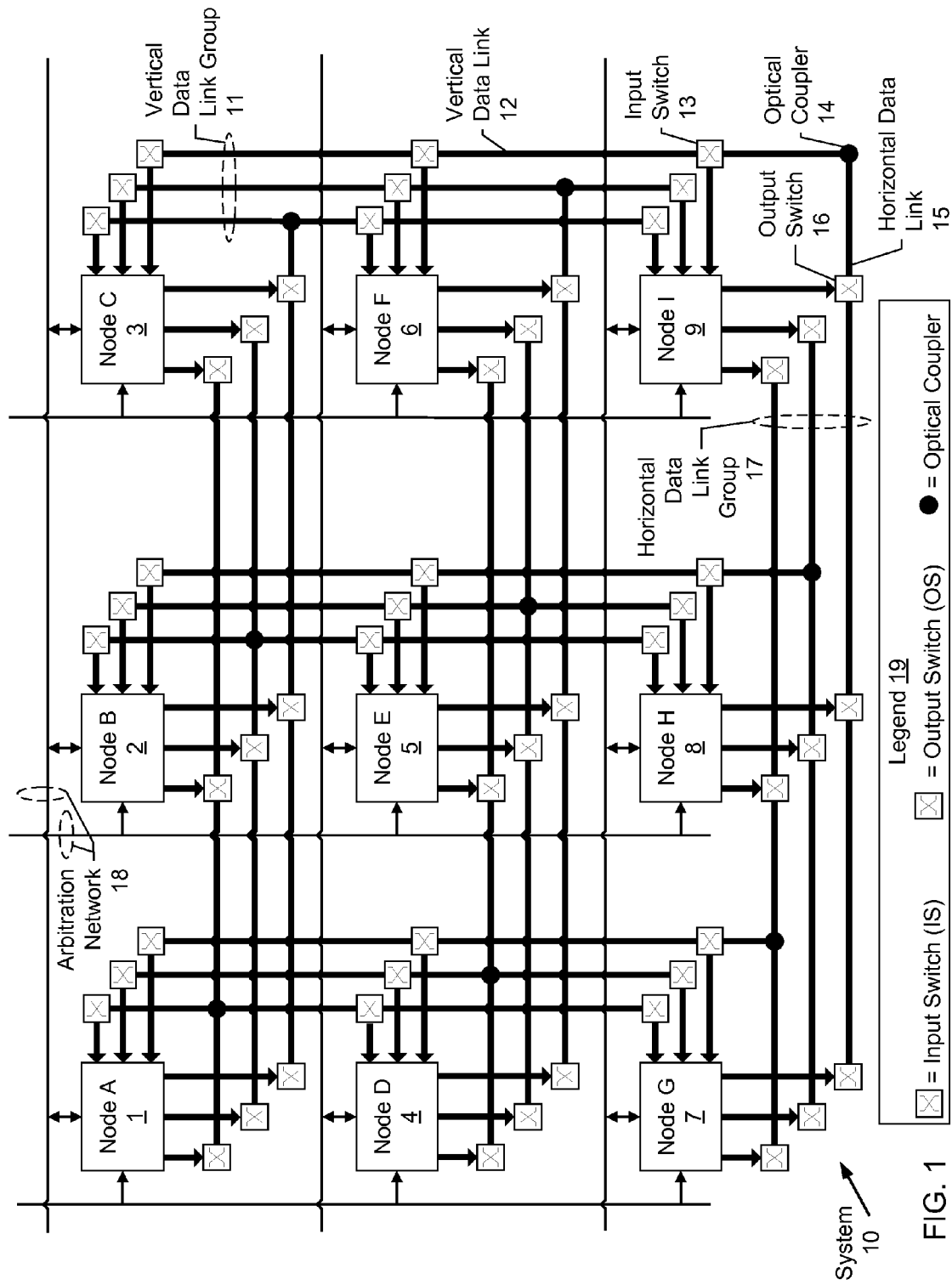
FIGS. 1 and 2 show schematic diagrams of data networks in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for arbitration amongst multiple nodes in an arbitration domain. An arbitration domain is a group of nodes that use arbitration to determine an order in which the nodes of the group are permitted to transmit (i.e., send) data to one or more receiving nodes. Between each sending node and receiving node is a data path connecting the two nodes. One or more segments of a data path may intersect with other data paths. The multiple data paths that intersect form a data channel. Said in other words, data paths in different data channels do not intersect. Accordingly, a data channel connects a group of nodes configured to send data to a set of receiving nodes using intersecting data paths. The set of receiving nodes may be composed of a single node or multiple nodes.

In one or more embodiments of the invention, a separate arbitration domain exists for each data channel. Thus, data paths associated with different arbitration domains do not intersect. The transmitting nodes (or sending nodes) in the arbitration domain are the transmitting nodes connected to the data channel. The set of the receiving node(s) in the data channel are referred to as receiving nodes of the arbitration domain. In one or more embodiments of the invention, the arbitration domain is composed of the sending nodes, the set of receiving nodes, and the intersecting data paths. Accordingly, arbitration domains having the same sending nodes but different sets of receiving nodes are identified as different arbitration domains.

In general, a sending node may belong to multiple arbitration domains. For example, consider a group of sending nodes connected to (i) receiving node X using a first group of intersecting data paths; and (ii) receiving node Z using a second group of intersecting data paths. In the example, each node in the group belongs to at least two arbitration domains (i.e., a first arbitration domain for the set of receiving nodes containing node X and a second arbitration domain for the set of receiving nodes containing node Z). The first arbitration domain allows the group of sending nodes to arbitrate for timeslots (discussed below) in which to send data (e.g., to node X) using the first group of data paths. Similarly, the second arbitration domain allows the group of sending nodes to arbitrate for timeslots in which to send data (e.g., to node Z) using the second group of data paths. These arbitration domains sharing the same nodes (i.e., sending nodes) form a set of arbitration domains. In general, a system of nodes may include multiple sets of arbitration domains.

In one or more embodiments of the invention, data is transmitted from the sending nodes to one or more receiving nodes of an arbitration domain during a series of timeslots. The timeslots may have a fixed duration or a variable duration. Each timeslot is allocated exclusively to one sending node in the arbitration domain. In one or more embodiments of the invention, the series of timeslots is controlled by a common timeslot clock shared among nodes in the arbitration domain. During each timeslot, only the node exclusively allocated to the present timeslot is allowed to send data to a receiving node of the arbitration domain. The allocation of the timeslots is the result of arbitration amongst the multiple sending nodes in the arbitration domain. As only one of the sending nodes in an arbitration domain is permitted to transmit during a timeslot, the arbitration process is based on the principles of time division multiplexing (TDM).

In one or more embodiments of the invention, the arbitration is performed using an arbitration network allowing sending nodes to broadcast arbitration requests during arbitration intervals. The arbitration intervals may have a fixed duration. In one or more embodiments, for each timeslot there exists a corresponding arbitration interval. The arbitration interval occurs prior to the timeslot. It is during the arbitration interval that the corresponding timeslot is assigned to one of the sending nodes. In one or more embodiments of the invention, the series of arbitration intervals is controlled by a common arbitration clock shared among nodes in the arbitration domain.

Generally speaking, the duration of a timeslot is independent of the duration of an arbitration interval. In one or more embodiments, the duration of each timeslot is larger than the duration of an arbitration interval. In one or more embodiments of the invention, as data paths in different arbitration domains do not intersect, the timeslots and the arbitration intervals for one arbitration domain are independent of the timeslots and the arbitration intervals for other arbitration domains in the system.

In one or more embodiments of the invention, arbitration is performed using a two part arbitration mechanism. During the first part, a sending node is configured to broadcast a transmitter arbitration request to all sending nodes within the arbitration domain. During the second part, the sending node is configured to broadcast a receiver arbitration request to the intended receiver node. Both parts of the arbitration mechanism may be performed during an arbitration interval. Moreover, both parts of the arbitration mechanism may occur simultaneously or at least partially overlap in time.

In one or more embodiments of the invention, an arbitration interval is assigned to a sending node in the arbitration domain based on a pre-determined order (e.g., round robin). It is during this assigned arbitration interval that the selected sending node broadcasts the transmitter arbitration request and receiver arbitration request. More details of the arbitration network, the transmitter arbitration request, and the receiver arbitration request are discussed in reference to FIG. 3 below.

FIG. 1 shows a system (10) in accordance with one or more embodiments of the invention. Those skilled in the art, having the benefit of this detailed description, will appreciate that the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (10) includes multiple nodes (e.g., Node A (1)-Node I (9)), an optical data network (designated in FIGS. 1-4 by the thick black lines) and an optical arbitration network (18) (designated in FIGS. 1-4 by thin black lines).

In one or more embodiments of the invention, the system (10) corresponds to a macro-chip architecture based on optical data communication. The macro-chip architecture may include a silicon photonic optical network. Specifically, optical data links (e.g., Vertical Data Link Group (11), Horizontal Data Link Group (17)) in the silicon photonic optical network are shared between nodes (e.g., Node A (1)-Node I (9)) of the macro-chip by dynamically switching the optical data links between different sources (i.e., sending nodes) and destinations (i.e., receiving nodes) in the macro-chip. For example, the silicon photonic optical network may be a switched optical network that uses one or more 1×2 broadband optical switching elements.

Each of the nodes (e.g., Node A (1)-Node I (9)) in the system (10) may correspond to a die (e.g., semiconductor die). In one or more embodiments of the invention, each die may include one or more processors and/or one or more cache memories. Further, all nodes (e.g., Node A (1)-Node I (9)), may be disposed on a single chip (e.g., a macro-chip) as part of a larger mesh structure.

As discussed above, the nodes (e.g., Node A (1)-Node I (9)) are operatively coupled using a data network. The data network includes multiple shared optical data link groups (e.g., Vertical Data Link Group (11), Horizontal Data Link Group (17)) for the transmission of data. An optical data link group is a collection of data links. For example, the vertical data link group (11) includes the vertical data link (12). Similarly, the horizontal data link group (17) includes the horizontal data link (15).

Each data link (e.g., vertical data link (12), horizontal data link (15)) includes one or more waveguides. A waveguide is a transmission medium for transmitting optical signals carrying/representing data. Each optical signal may be a carrier signal having a wavelength selected by the sender of the data. Data travels from one node to another node along the data waveguides. The path of the data from one node to another node forms a data path. When multiple data paths intersect (i.e., have at least one data link in common), the intersecting data paths form a data channel. Because the data paths intersect, the nodes (e.g., Node A (1)-Node I (9))) sending the data must arbitrate to determine which node is entitled to use the shared optical data links of the data channel during a timeslot. The arbitration is performed using the arbitration network (18). The arbitration network is discussed in more detail below and in FIGS. 3 and 4.

Still referring to FIG. 1, vertical data links and horizontal data links are connected using optical couplers (e.g., Optical Coupler (14)). An optical coupler is configured to redirect optical signals propagating on one data waveguide to another data waveguide. For example, the optical coupler (14) is configured to redirect optical signals propagating on the horizontal data link (15) to the vertical data link (12). As shown in the legend (19) on FIG. 1, optical couplers are designated by a solid black circle.

As shown in FIG. 1, nodes (e.g., Node A (1)-Node I (9)) connect to the optical data network via input switches and output switches. For example, the node I (9) is coupled to the horizontal data link (15) via the output switch (16). The node I (9) is coupled to the vertical data link (12) via the input switch (13). Thus, the node I (9) sends data via the output switch (16) and receives data via the input switch (13). In one or more embodiments of the invention, the input switches are broadband switches. Accordingly, when an input switch is activated (i.e., turned on), the input switch switches all the wavelengths from an input waveguide to one of two output waveguides. When the input switch is deactivated (i.e., turned off), all wavelengths from the input waveguide are passed through to the other input waveguide. In other words, the input switches include functionality to switch data propagating on a data link to a receiving node. Similarly, output switches are configured to switch data sent by a sending node to a data link.

Although not explicitly labeled in FIG. 1, a node row is all of the nodes in a single row. For example, the node A (1), the node B (2), and the node C (3) form node row 0. Likewise, the node D (4), the node E (5), and the node F (6) form node row 1. Also, the node G (7), the node H (8) and the node I (9) form node row 2. A node column is all of the nodes in a single column. For example, the node A (1), the node D (4), and the node G (7) form node column 0. Likewise, the node B (2), the node E (5), the node H (8) form node column 1. Also, the node C (3), the node F (6), and the node I (9) form node column 2. In this context, the horizontal data link group (17) and the horizontal data link (15) are associated with the node row 2, while the vertical data link group (11) and the vertical data link (12) are associated with the node column 2.

In one or more embodiments of the invention, the architecture of the system (10) effectively creates multiple arbitration domains for the nodes of a node row. Specifically, the nodes of a node row must arbitrate for timeslots to communicate with the nodes in each node column. The node wining the arbitration for a timeslot turns on the output switch feeding a horizontal data link, while the receiving node turns on the input switch along a corresponding vertical data link.

For example, there exists an optical data channel connecting the nodes of node row 0 with the nodes of node column 0. There exists a different optical data channel connecting the nodes of node row 0 with the node of node column 1. There exists yet a different optical data channel connecting the nodes of node row 0 with the nodes of node column 2. A similar configuration exists between the nodes of node row 1 and node columns 0, 1, and 2. A similar configuration also exists between the nodes of node row 2 and node columns 0, 1, and 2.

Accordingly, each node row/node column pair in FIG. 1 is a different arbitration domain. For example, node A (1) belongs to an arbitration domain composed of node A (1), node B (2), and node C (3) to arbitrate for access to node column 0, another arbitration domain composed of node A (1), node B (2), and node C (3) to arbitrate for access to node column 1, and a third arbitration domain arbitration domain composed of node A (1), node B (2), and node C (3) to arbitrate for access to node column 2. As the system (10) is a three by three array of nodes, there exist three arbitration domains for each node row in FIG. 1. Therefore, there exists a total of nine arbitration domains in the system (10).

Although FIG. 1 shows a system having three node rows and three node columns, more or fewer node rows and/or node columns may be used without departing from the scope of the invention. In one or more embodiments of the invention, the number of node rows is equal to the number of node columns. In one or more embodiments of the invention, increases in the number of node rows and node columns may be achieved by adding additional data links, input switches, and output switches.

Figure 2:
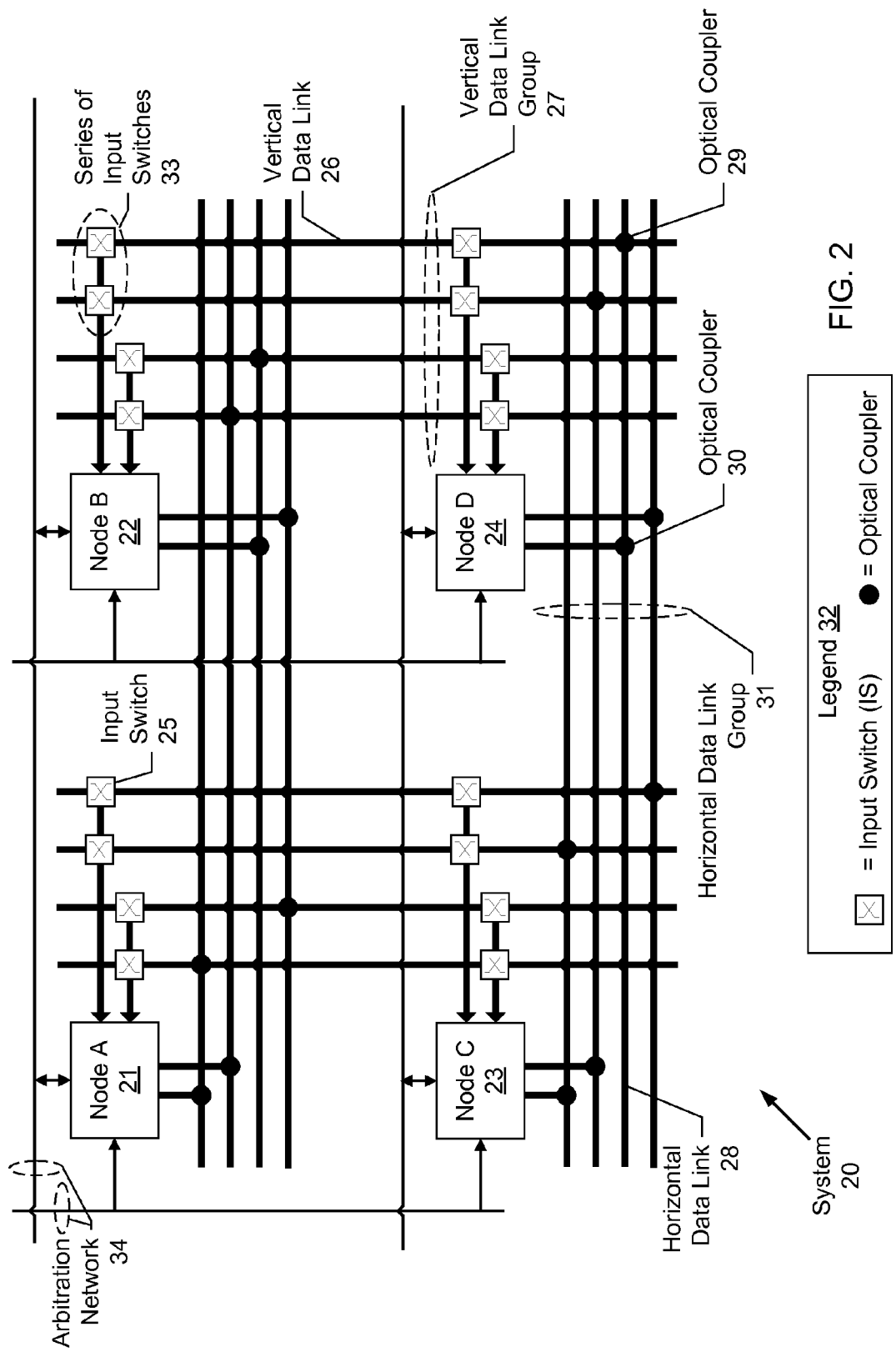

FIG. 2 shows a system (20) in accordance with one or more embodiments of the invention. Those skilled in the art, having the benefit of this detailed description, will appreciate that the components shown in FIG. 2 may differ among embodiments of the invention, and that one or more of the components may be optional. In one or more embodiments of the invention, one or more of the components shown in FIG. 2 may be omitted, repeated, supplemented, and/or otherwise modified from that shown in FIG. 2. Accordingly, the specific arrangement of components shown in FIG. 2 should not be construed as limiting the scope of the invention.

The system (20) includes a different optical data network (i.e., designated by the thick black lines) than the network shown in FIG. 1. As shown in FIG. 2, the system (20) includes an array of nodes (e.g., Node A (21), Node B (22), Node C (23), Node D (24)) operatively coupled using shared optical data links. The nodes (e.g., Node A (21)-Node D (24)), the node rows, the node columns, the data link groups (e.g., Horizontal Data Link Group (31), Vertical Data Link Group (27)), and the data links (e.g., Horizontal Data Link (28), Vertical Data Link (26)) are essentially the same as the nodes, the node rows, the node columns, the data link groups, and the data links, respectively, as discussed above in reference to FIG. 1. Moreover, the nodes (e.g., Node A (21)-Node D (24)) in FIG. 2 are configured to communicate with the data network shown in FIG. 2, which is arbitrated using the arbitration network (34). The system (20) includes multiple arbitration domains and the arbitration network (34) is configured to enable arbitration amongst nodes in each of the arbitration domains (discussed below).

In one or more embodiments of the invention, each node is coupled to a horizontal data link via an optical coupler. For example, the node D (24) is connected to the horizontal data link (28) by the optical coupler (30). The legend (32) identifies the symbol for optical couplers. An optical coupler is configured to redirect optical signals propagating on one data waveguide to another data waveguide. In this example, the optical coupler (30) allows the node D (24) to transmit data on the horizontal data link (28) by redirecting the optical signal(s) from the node D (24) to the horizontal data link (28). In other words, the optical coupler redirects optical signals generated by the node onto the horizontal data link.

Further, each node is coupled to a vertical data link via an input switch. Specifically, each input port (not shown) of a node is connected to a series of input switches. For example, the input port of the node B (22) is connected to the series of input switches (33). In one or more embodiments of the invention, the number of switches in the series is dependent on the number of node rows. Additional node columns may be added to the data network without departing from the scope of the invention. For example, additional node columns may be added to the system shown in FIG. 2 by adding additional horizontal and vertical waveguides and adding another switch in each of the series of switches. Further, additional node rows may be added by adding an additional series of switches, connecting another input port of the node to the additional series of switches, and adding corresponding horizontal and vertical waveguides.

In one or more embodiments of the invention, the data paths connecting a single receiving node with the sending nodes in a node row intersect. Specifically, all nodes in a node row connect to the same input port on the receiving node. Therefore, the data paths from the nodes in a node row intersect. As the data paths intersect, the data paths form a data channel from the nodes in the node row to the particular receiving node. Therefore, all sending nodes in a node row are in an arbitration domain for the data channel to the receiving node. Specifically, the nodes of a node row must arbitrate for timeslots to communicate with any receiving node. The node wining the arbitration for a timeslot sends data to a horizontal data link during the timeslot. The receiving node activates, during the timeslot, an input switch (of a series of input switches) for the corresponding vertical data link.

In one or more embodiments of the invention, there exists one arbitration domain for each node row/receiving node pair. In other words, all nodes in a node row belong to a number of arbitration domains, and the number of arbitration domains equals the number of possible receiving nodes. As the system (20) is a two by two array of nodes, there exists four arbitration domains for each node row in FIG. 2. Therefore, there exists a total of 8 arbitration domains in the system (20).

Although FIG. 2 shows a system having two node rows and two node columns, more or fewer node rows and/or node columns may be used without departing from the scope of the invention. In one or more embodiments of the invention, the number of node rows is equal to the number of node columns. Alternatively, the number of node rows does not equal the number of node columns. In one embodiment of the invention, increases in the number of node rows and node columns may be achieved by adding additional data links and input switches.

Figure 3:
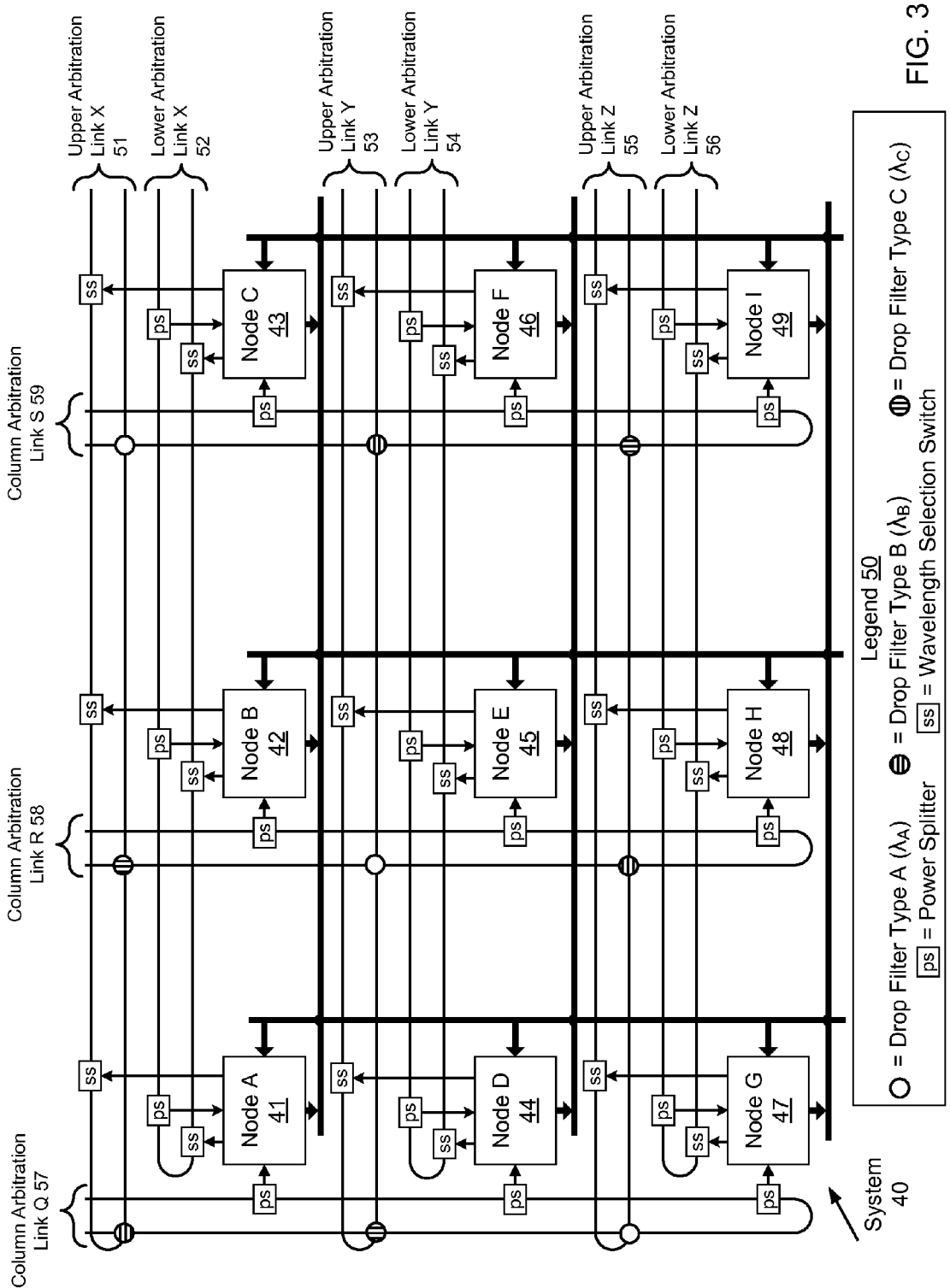
FIG. 3 shows a schematic diagram of an arbitration network in accordance with one or more embodiments of the invention.

FIG. 3 shows a system (40) in accordance with one or more embodiments of the invention. The system (40) includes both an optical data network (denoted by thick black lines) and an optical arbitration network (denoted by thin black lines). Those skilled in the art, having the benefit of this detailed description, will appreciate the components shown in FIG. 3 may differ among embodiments of the invention, and that one or more of the components may be optional. In one or more embodiments of the invention, one or more of the components shown in FIG. 3 may be omitted, repeated, supplemented, and/or otherwise modified from that shown in FIG. 3. Accordingly, the specific arrangement of components shown in FIG. 3 should not be construed as limiting the scope of the invention.

The arbitration network shown in FIG. 3 may be used with virtually any size and type of data network, including the data networks shown in FIG. 1 and FIG. 2. In other words, the data network of FIG. 3 may correspond to either of the data networks shown in FIG. 1 or FIG. 2. As discussed above, in FIG. 1, each node row/node column pair corresponds to an arbitration domain. As also discussed above, in FIG. 2, each node row/receiving node corresponds to an arbitration domain.

As shown in FIG. 3, each arbitration domain is connected to an upper arbitration link and a lower arbitration link. Each arbitration link (e.g., upper arbitration link X (51), lower arbitration link Y (52)) includes one or more waveguides. For example, an arbitration domain that includes the node A (41), the node B (42), and the node C (43) is connected to the upper arbitration link X (51) and the lower arbitration link X (52). Similarly, an arbitration domain that includes the node D (44), the node E (45), and the node F (46) is connected to the upper arbitration link Y (53) and the lower arbitration link Y (54). Likewise, an arbitration domain that includes the node G (47), the node H (48), and the node I (49) is connected to the upper arbitration link Z (55) and the lower arbitration link Z (56).

In one or more embodiments of the invention, each arbitration link (e.g., lower arbitration link, upper arbitration link, column arbitration link) includes one or more waveguides configured to propagate optical signals of a variety of wavelengths. In one or more embodiments of the invention, the number of waveguides for each arbitration link is dependent on the number of nodes in the arbitration domain. A larger system (40) may be built by increasing the number of waveguides, by increasing the number of wavelengths within a waveguide, or a combination of the two.

The lower arbitration link (e.g., Lower Arbitration Link X (52), Lower Arbitration Link Y (54), Lower Arbitration Link Z (56)) interconnects nodes within an arbitration domain. In one or more embodiments of the invention, a sending node is configured to broadcast a transmitter arbitration request on the lower arbitration link via a wavelength selection switch (identified in the legend (50)). A wavelength selection switch switches an optical signal of a specific wavelength (e.g., $\lambda_A$), or optical signals falling within a range of wavelengths, in a waveguide from an input port to any of two output ports. Accordingly, a sending node may broadcast a transmitter arbitration request to all nodes in the arbitration domain using a lower arbitration link (discussed below). In one or more embodiments of the invention, a transmitter arbitration request includes a column identifier denoting the column in which the receiving node is located.

In one or more embodiments of the invention, each node in a node row is configured to receive transmitter arbitration requests propagating along a lower arbitration link via a power splitter (identified in the legend (50)). In one or more embodiments of the invention, the power splitter is configured to divide the total incoming optical power into two outputs of equal or different optical powers: one output is fed into the node, the other output continues along the lower arbitration link.

In one or more embodiments of the invention, a sending node is configured to broadcast a receiver arbitration request on an upper arbitration link (e.g., Upper Arbitration Link X (51), Upper Arbitration Link Y (53), Upper Arbitration Link Z (55)). The receiver arbitration request may include a row identifier to identify the row in which the receiving node is located. The receiver arbitration request is sent during the same arbitration interval as that of the transmitter arbitration request. In one or more embodiments of the invention, the transmitter arbitration request and the receiver arbitration request are sent simultaneously.

In one or more embodiments of the invention, the sending node sends a receiver arbitration request to the receiving node to prepare the receiving node to receive data. In one or more embodiments, each node is coupled to an upper arbitration link via a wavelength selection switch. The upper arbitration link is connected to a column arbitration link (e.g., Column Arbitration Link Q (57), Column Arbitration Link R (58), Column Arbitration Link S (59)) via a drop filter. In one or more embodiments of the invention, each drop filter is configured to select an optical signal having a predetermined wavelength (e.g., $\lambda_A$, $\lambda_B$, or $\lambda_C$), or a signal having a wavelength falling within a small predetermined range of wavelengths, from the upper arbitration link, and redirect (i.e., drop) the selected optical signal into the column arbitration link.

In one or more embodiments of the invention, each drop filter within the upper arbitration link is configured to redirect (i.e., drop) optical signals of a unique wavelength. In other words, no two drop filters within the same upper arbitration link are configured to drop optical signals of the same wavelength. Furthermore, each drop filter within a column arbitration link is configured to redirect (i.e., drop) optical signals of a unique wavelength. In other words, no two drop filters within the same column arbitration link are configured to redirect (i.e., drop) optical signals of the same wavelength.

In one or more embodiments of the invention, the wavelength selection switches (identified in the legend (50)) allow for wavelength division multiplexing (WDM). As a result of the WDM, multiple transmitter arbitration requests and multiple receiver arbitration requests belonging to multiple arbitration domains may be broadcasted simultaneously on the same arbitration waveguides (i.e., one or more waveguides in the upper arbitration link, lower arbitration link, and/or column arbitration link) using different wavelengths.

As an example, a receiver arbitration request from node F (46) to node G (47) may be sent using an optical signal of wavelength $\lambda_C$, corresponding to the wavelength redirected by a drop filter of type C. As another example, a receiver arbitration request from node E (45) to node H (48) may be sent in the wavelength $\lambda_A$, corresponding to the wavelength redirected by a drop filter of type A.

In one or more embodiments of the invention, the receiver arbitration request is received by all receiving nodes in a node column. As discussed above, the receiver arbitration request includes a row identifier of the receiving node such that each node in the node column may determine whether the receiver arbitration request identifies itself as the receiving node or not. For example, a receiver arbitration request sent from the node H (48) and destined for the node C (43) includes an identifier for the node row 0 (i.e., the node row in which the node C (43) is located). The node C (43), the node F (46), and the node I (49) may all receive the receiver arbitration request sent by the node H (48). The node C (43) determines from the receiver arbitration request that is the intended recipient of the data from the node H (43). However, both the node F (46) and the node I (49) determine from the receiver arbitration request that they are not the intended recipients of data sent by the node H (48).

In one or more embodiments of the invention, the nodes are connected to the column arbitration links using power splitters. The power splitter is configured to divide the total incoming optical power, including a receiver arbitration request, into two outputs of equal or different optical powers: one output is fed into the receiving node, the other output continues along the column arbitration link.

In one or more embodiments of the invention, each receiving node is configured to identify the arbitration domain that issued the receiver arbitration request based on the wavelength of the incoming optical signal carrying/representing the receiver arbitration request. For example, when the node E (45) receives an incoming optical signal of wavelength $\lambda_B$ carrying/representing an receiver arbitration request, the node E (45) determines the receiver arbitration request is from the arbitration domain including the node G (47), the node H (48), and the node I (49). However, when the node E (45) receives an incoming optical signal of wavelength $\lambda_C$, the node E (45) determines the receiver arbitration request is from the arbitration domain including the node A (41), the node B (42), and the node C (43). Accordingly, each receiving node may determine the arbitration domain (among the multiple arbitration domains sharing the arbitration network) to which the received receiver arbitration request belongs.

Although FIG. 3 uses the terms upper and lower with reference to arbitration links, the actual relative configuration of arbitration links with respect to each other may differ from the configuration shown in FIG. 3 without departing from the scope of the invention. For example, the upper arbitration link may be switched with the lower arbitration link. Furthermore, although FIG. 3 shows three types of drop filter, more types of drop filters may be used without departing from the scope of the invention.

Figure 4:
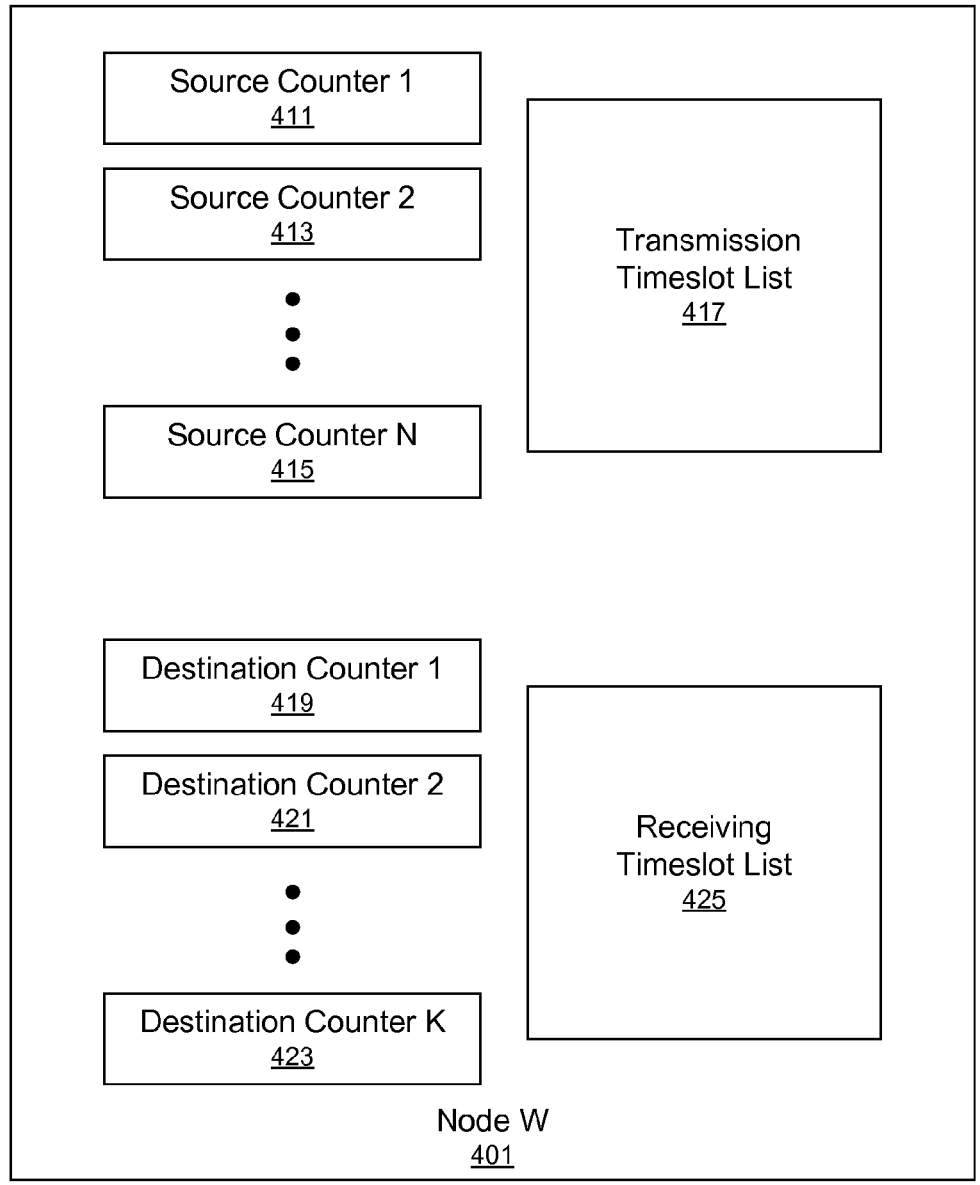
FIG. 4 shows a schematic diagram of a node having a data structure for performing arbitration in accordance with one or more embodiments of the invention.

FIG. 4 shows a node (i.e., Node W (401)) in accordance with one or more embodiments of the invention. The node W (401) may be essentially the same as any of node in the system (10), the system (20), and/or the system (40), discussed above in reference to FIG. 1, FIG. 2, and FIG. 3. Those skilled in the art, having the benefit of this detailed description, will appreciate the components shown in FIG. 4 may differ among embodiments of the invention, and that one or more of the components may be optional. In one or more embodiments of the invention, one or more of the components shown in FIG. 4 may be omitted, repeated, supplemented, and/or otherwise modified from that shown in FIG. 4. Accordingly, the specific arrangement of components shown in FIG. 4 should not be construed as limiting the scope of the invention.

As shown in FIG. 4, the node W (401) includes one or more source counters (e.g., Source Counter 1 (411), Source Counter 2 (413), Source Counter N (415), etc.), one or more destination counters (e.g., Destination Counter 1 (419), Destination Counter 2 (421), Destination Counter K (423), etc.), a transmission timeslot list (417), and a receiving timeslot list (425). Although not specifically shown in FIG. 4, the node W (401) also includes various input and output ports for interfacing with the optical data network (e.g., designated in FIGS. 1-3 by the thick black lines) and the optical arbitration network (e.g., designated in FIGS. 1-3 by the thin black lines) in the system (e.g., system (10), system (20), and system (40)).

In one or more embodiments of the invention, although not specifically shown, the node W (401) also includes information (e.g., row identifier, column identifier, or other references) of various arbitration domains to which it belongs as either a sending or a receiving node. Similarly, the node W (401) also includes information (e.g., identifier, references, or state information) identifying arbitration intervals associated with the mentioned arbitration domains. Further, the node W (401) includes information (e.g., identifier, references, or state information) identifying timeslots for data transmission associated with the mentioned arbitration domains.

As discussed above in reference to FIG. 1, FIG. 2, and FIG. 3, the node W (401) receives transmitter arbitration requests broadcasted by sending nodes in the same arbitration domain as the node W (401). In one or more embodiments of the invention, the node W (401) includes a source counter for each arbitration domain in which the node W (401) is a sending node. In such embodiments, upon the arrival of a transmitter arbitration request, the arbitration domain corresponding to the transmitter arbitration request is determined, the source counter corresponding to the arbitration domain is identified, and said source counter is incremented. In other words, the source counter for an arbitration domain is incremented in response to receiving a transmitter arbitration request from a sending node in the arbitration domain. Each count of each source counter corresponds to a future timeslot (in the set of timeslots associated with the corresponding arbitration domain) in which data may be transmitted from a sending node to a receiving node.

In addition, when the node W (401) is a sending node, the node W (401) broadcasts a transmitter arbitration request corresponding to a specific arbitration domain in which the node W (401) is the sending node. The value of the counter corresponding to the arbitration domain is recorded in the transmission timeslot list (417). The transmission timeslot list (417) may be implemented in hardware, software, or any combination of hardware and software. As discussed above, the value of the counter corresponds to an upcoming timeslot for data transmission. Specifically, the value represents a future timeslot (in the set of timeslots associated with the corresponding arbitration domain) allocated to the node W (401) for sending data to the receiving node.

In one or more embodiments of the invention, the node W (401) includes a destination counter for each arbitration domain in which the node W (401) is a receiving node. In such embodiments, upon the arrival of a receiver arbitration request, the arbitration domain corresponding to the receiver arbitration request is determined, the destination counter corresponding to the arbitration domain is identified, and said destination counter is incremented. In other words, the destination counter for an arbitration domain is incremented in response to receiving a receiver arbitration request from a sending node in the arbitration domain. Specifically, each count of each destination counter represents a future timeslot (in the timeslots associated with the corresponding arbitration domain) for the node W (401) to potentially receive data from the sending node.

In addition, when an incoming receiver arbitration request identifies the node W (401) as the receiving node, the value of the destination counter corresponding to the determined arbitration domain is recorded in the receiving timeslot list (425). The receiving timeslot list (425) may be implemented in hardware, software, or any combination of hardware and software. In one or more embodiments of the invention, the value of the destination counter is recorded prior to incrementing the destination counter. Specifically, the value represents a future timeslot (in the set of timeslots associated with the corresponding arbitration domain) during which a sending node will transmit data to the node W (401). In one or more embodiments of the invention, the sending node that issued the incoming receiver arbitration request is also recorded in the receiving timeslot list (425) with the value of the destination counter. The sending node that issued the receiver arbitration request may be recorded in order to activate the correct input switch of a series of input switches (e.g., Series of Input Switches (33), discussed above in reference to FIG. 2) connected to the node W (401) during the future timeslot.

Assume that the node W (401) is a node in the system (10), discussed above in reference to FIG. 1. Accordingly, the node W (401) includes three source counters, one source counter for each node row/node column pair in which the node W (401) is a sending node (i.e., each arbitration domain in which the node W (401) is a sending node). Further, the node W (401) includes three destination counters, one destination counter for each node row/node column pair in which the node W (401) is a receiving node (i.e., each arbitration domain in which the node W (401) is a receiving node).

Now assume that the node W (401) is a node in the system (20), discussed above in reference to FIG. 2. Accordingly, the node W (401) includes four source counters, one source counter for each node row/receiving node pair in which the node W (401) is a sending node (i.e., each arbitration domain in which the node W (401) is a sending node). Further, the node W (401) includes two destination counters, one destination counter for each node row/receiving node pair in which the node W (401) is a receiving node (i.e., each arbitration domain in which the node W (401) is a receiving node).

FIGS. 5-8 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

The flowcharts shown in FIGS. 5-8 are from the perspective of a node (e.g., Node W (401), discussed above in reference to FIG. 4). In one or more embodiments of the invention, each node in the system (e.g., System (10), System (20), and System (40) described in reference to FIGS. 1-3 above) performs the steps in the flowcharts for each arbitration domain in which the node is a member. The particular node and the particular arbitration domain pertaining to the description of FIGS. 5-8 may be referred to as the present node and the present arbitration.

Figure 5:
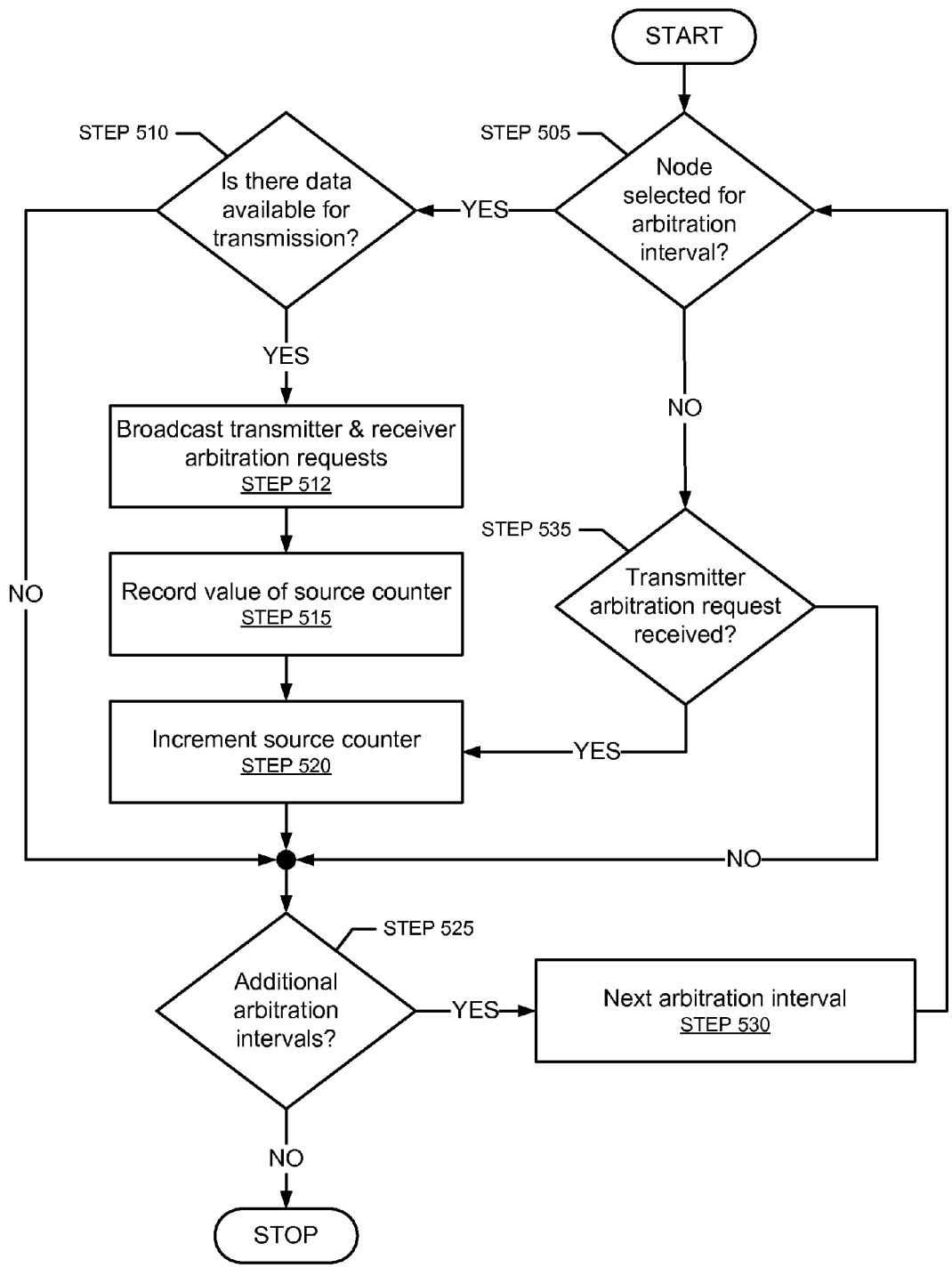
FIGS. 5-8 show flowcharts in accordance with one or more embodiments of the invention.

FIG. 5 shows a flowchart in accordance with one or more embodiments of the invention. The process shown in FIG. 5 may be executed to allocate upcoming timeslots to sending nodes. FIG. 5 is from the perspective of a sending node in an arbitration domain. In one or more embodiments of the invention, each sending node in the system performs the steps shown in FIG. 5 for each arbitration domain to which the sending node belongs.

Initially, in Step 505, it is determined whether the node is selected for the current arbitration interval. As discussed above, sending nodes within an arbitration domain are selected one at a time according to a pre-determined order (e.g., a round robin scheme). As also discussed above, each arbitration interval corresponds to an upcoming timeslot during which data may be transmitted from the selected sending node to a receiving node. When it is determined that the sending node is selected for the current arbitration interval, the process proceeds to Step 510. When it is determined that the sending node is not selected for the current arbitration interval, the process proceeds to Step 535.

In Step 510, it is determined whether the sending node has data ready/available for transmission to a receiving node within the arbitration domain. As discussed above, the receiving node may be located in a node column and the sending node may be located in a node row. The data for transmission may be stored within a queue of the sending node. When it is determined that the sending node has data ready/available for transmission to a receiving node, the process to Step 512. When it is determined that the process does not have data ready/available for transmission to a receiving node, the process proceeds to Step 525.

In Step 512, the sending node broadcasts a transmitter arbitration request to all sending nodes in the arbitration domain. As discussed above, the transmitter arbitration request is broadcast using an arbitration link (e.g., a lower arbitration link). The transmitter arbitration request may identify the node column where the receiving node is located. The sending node also broadcasts a receiver arbitration request to all receiving nodes within the arbitration domain. The receiver arbitration request includes a row identifier to identify the node row where the receiving node is located. In one or more embodiments of the invention, the receiver arbitration request may be broadcast using an optical signal having a wavelength selected according to the architecture (e.g., drop filters) of the system (discussed above in reference to FIG. 3).

In Step 515, the value of the source counter corresponding to the present arbitration domain in the node is recorded. In one or more embodiments of the invention, the value may be recorded in a transmission timeslot list located within the node. As discussed above, this recorded value (i.e., recorded count) denotes a future timeslot allocated to the present node for sending data. In Step 520, the source counter corresponding to the present arbitration domain in the node is incremented.

In Step 535, it is determined whether the sending node has received a transmitter arbitration request from another sending node of the arbitration domain. As discussed above, a transmitter arbitration request generated by a sending node may be broadcasted to all sending nodes in the arbitration domain. When it is determined that a transmitter arbitration request has been received, the process proceeds to Step 520, where the source counter corresponding to the present arbitration domain in the node is incremented. Returning to Step 535, when it is determined that no transmitter arbitration request is received during the current arbitration interval, the process proceeds to Step 525.

In one or more embodiments of the invention, each sending node in the arbitration domain performs the steps (specifically Step 520) in the process of FIG. 5. Accordingly, each source counter corresponding to the present arbitration domain in each sending node maintains the same count. In one or more embodiments of the invention, this count corresponds to the next available timeslot for transmitting data.

In Step 525, it is determined whether additional arbitration intervals exist. When it is determined that additional arbitration intervals exist, the process proceeds to Step 530 for the next arbitration interval before returning to Step 505. When it is determined that no more arbitration intervals exist, the process ends. In one or more embodiments of the invention, Step 525 may be omitted. In such embodiments, Step 530 is executed immediately following, Step 510, Step 520, and/or Step 535.

Figure 6:
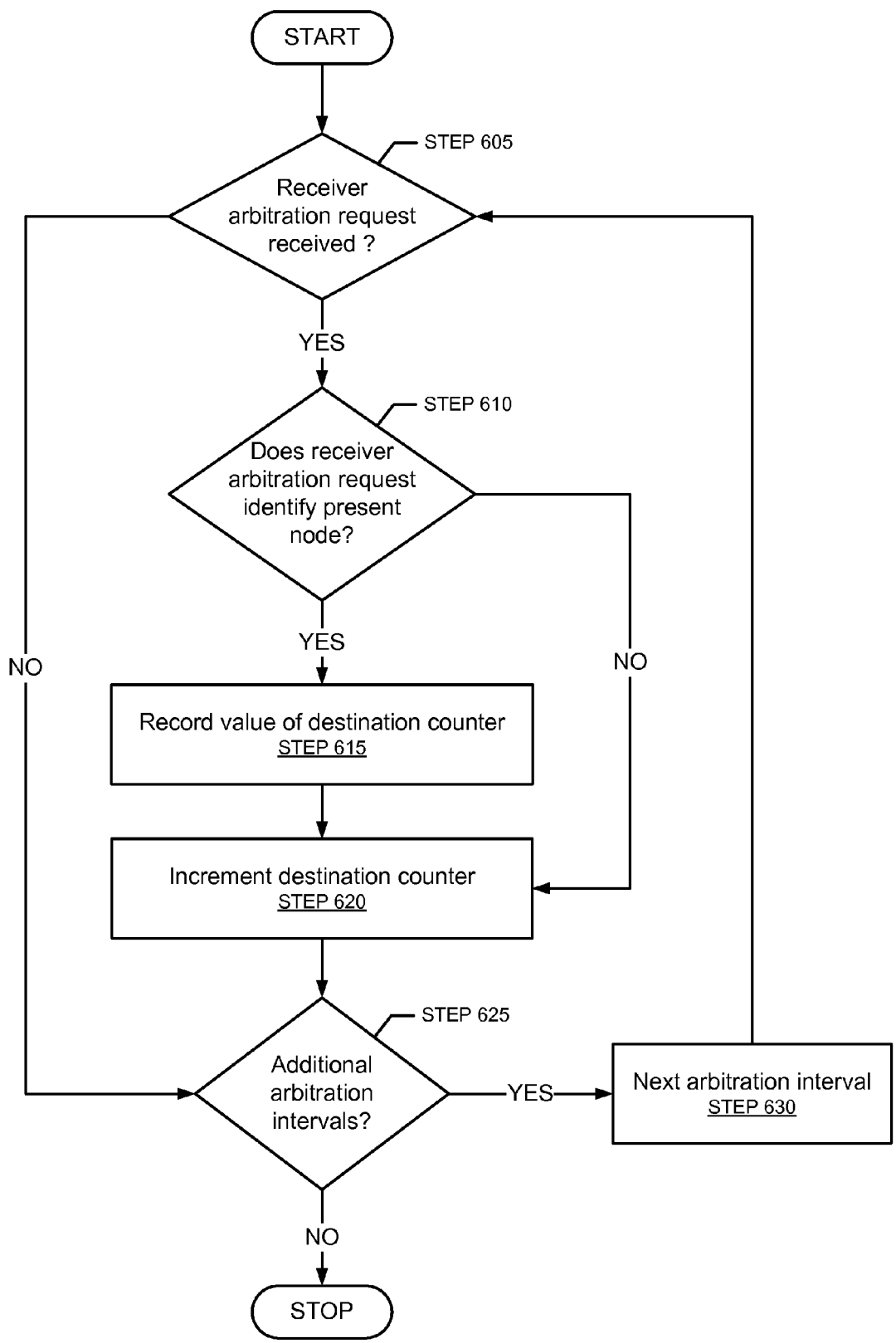

FIG. 6 shows a flowchart in accordance with one or more embodiments of the invention. The process shown in FIG. 6 may be executed to allocate timeslots to receiving nodes. FIG. 6 is from the perspective of a receiving node of an arbitration domain. In one or more embodiments of the invention, each node in the system performs the steps in the flowchart for each of the arbitration domains in which the node is a receiving node.

Initially, in Step 605, it is determined whether the node has received a receiver arbitration request during the current arbitration interval. When it is determined that the node has received a receiver arbitration request, the process proceeds to Step 610. However, when it is determined that the node has not received an receiver arbitration request in the current arbitration interval, the process proceeds to Step 625.

As discussed above, in one or more embodiments of the invention, the receiver arbitration request is sent to all nodes in a node column and includes a row identifier of the receiving node. In Step 610, it is determined whether the receiver arbitration request identifies the present node as the receiving node. This determination may be made, for example, based on the row identifier within the receiver arbitration request. When it is determined that the node is identified as the receiving node, the process proceeds to Step 615. When it is determined that the node is not identified as the receiving node, the process proceeds to Step 620.

As discussed above in reference to FIG. 4, in one or more embodiments of the invention, the node may include multiple destination counters each corresponding to a different arbitration domain in which the present node belongs as a receiving node. In Step 615, a value (i.e., count) of the destination counter corresponding to the present arbitration domain is recorded. In one or more embodiments of the invention, the value is recorded in a receiving timeslot list in the node. As discussed above, this recorded value (i.e., recorded count) denotes a future timeslot allocated to the present node for receiving data from a sending node in the present arbitration domain. In one or more embodiments of the invention, the sending node which issued the receiver arbitration request may also be recorded with the count of the destination counter. In Step 620, the destination counter corresponding to the present arbitration domain in the node is incremented.

In Step 625, it is determined whether additional arbitration intervals exist. When it is determined that additional arbitration intervals exist, the process proceeds to Step 630 for the next arbitration interval before returning to Step 605. When it is determined that no more arbitration intervals exist, the process ends. In one or more embodiments of the invention, Step 625 is omitted. In such embodiments, the Step 630 is executed immediate after Step 605 and/or Step 620.

Figure 7:
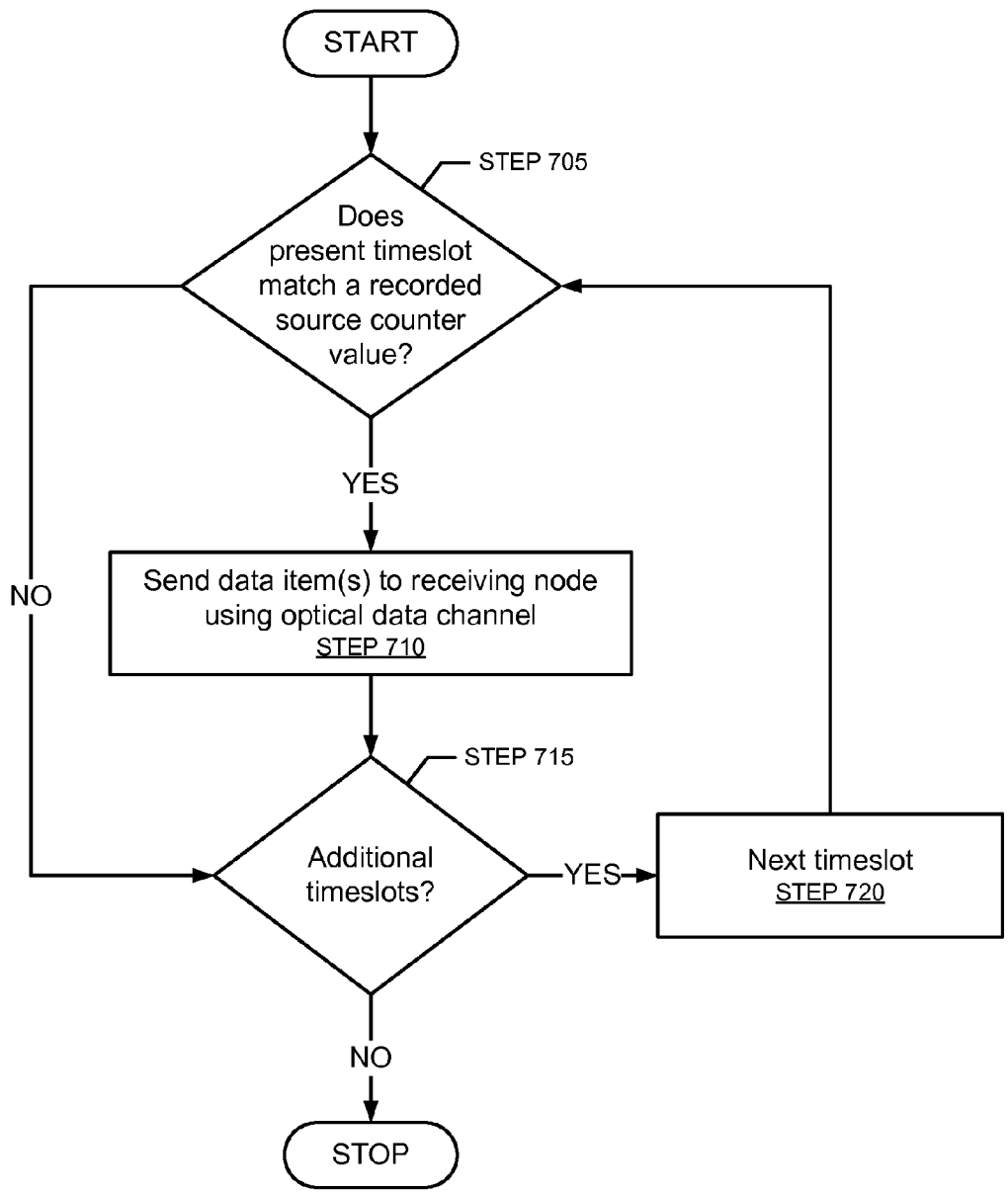

FIG. 7 shows a flowchart in accordance with one or more embodiments of the invention. The process shown in FIG. 7 may be executed to send data during a designated timeslot. FIG. 7 is from the perspective of a sending node in an arbitration domain. In one or more embodiments of the invention, each sending node in the system performs the steps in FIG. 7 for each of the arbitration domains in which the node is a sending node.

As discussed above, in one or more embodiments of the invention, the present node may belong to multiple arbitration domains as a sending node. Each arbitration domain may be associated with a series of time slots for data transmission. Further, the present node may include multiple source counters each corresponding to one of the multiple arbitration domains.

Initially, in Step 705, it is determined whether the present timeslot for the present arbitration domain matches a recorded value of the source counter corresponding to the present arbitration domain. As discussed above, values of the source counter may be recorded in a transmission timeslot list in the present node. When a match exists, the process proceeds to Step 710. However, when it is determined that there is no match, the process proceeds to Step 715.

In Step 710, the sending node sends one or more data items during the current timeslot using a data path associated with the present arbitration domain. Specifically, the sending node activates the output switch attached to the present node to feed the data onto the data path.

In Step 715, it is determined whether additional timeslots exist. When it is determined that additional timeslots exist, the process proceeds to Step 720 for the next timeslot before returning to Step 705. When it is determined that no more timeslots exist, the process ends. In one or more embodiments of the invention, Step 715 is omitted. In such embodiments, Step 720 is executed immediately after Step 710 and/or Step 705.

Figure 8:
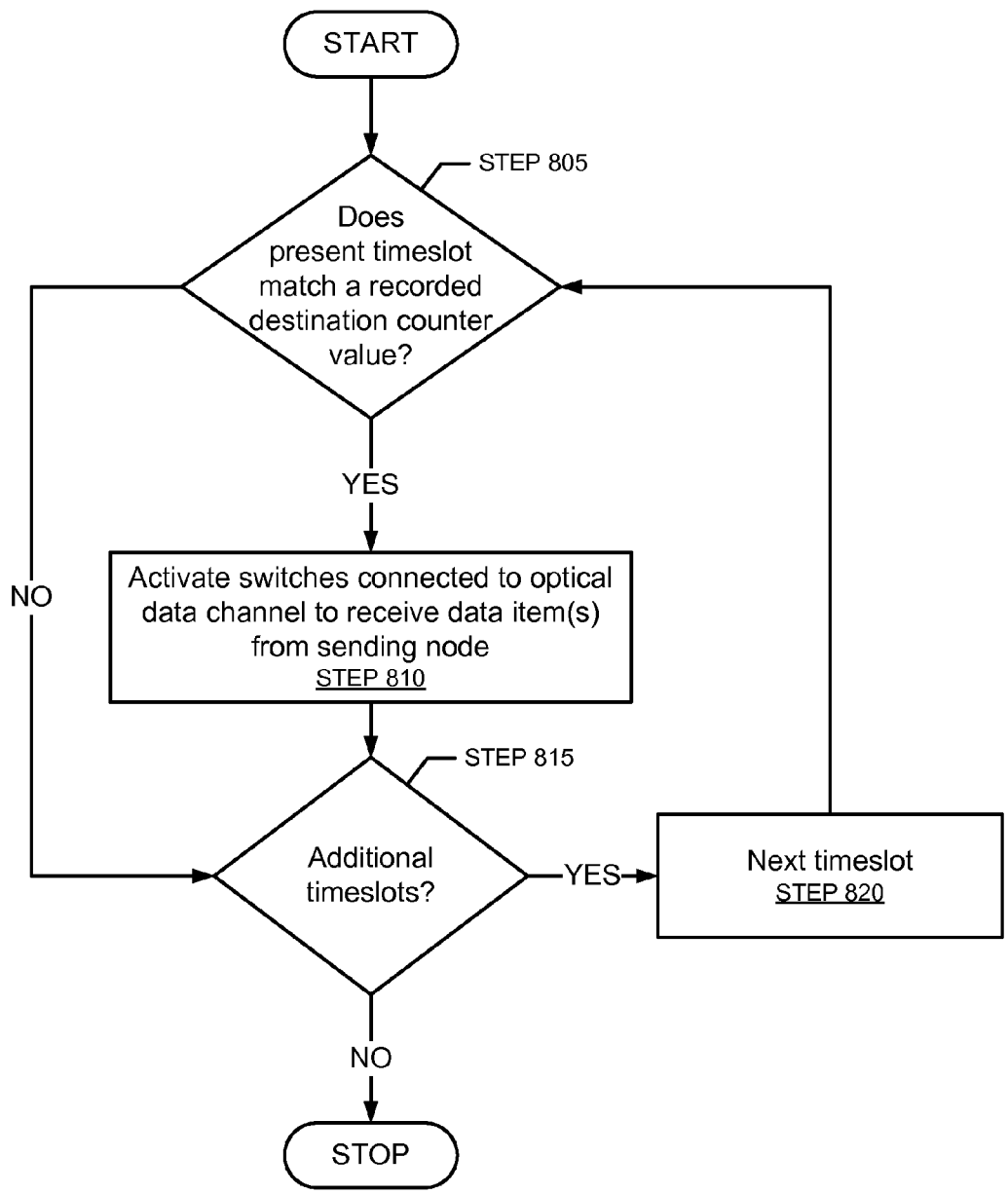

FIG. 8 shows a flowchart in accordance with one or more embodiments of the invention. The process shown in FIG. 8 may be executed by a receiving node to receive data during an allocated timeslot. FIG. 8 is from the perspective of a receiving node in an arbitration domain. In one or more embodiments of the invention, each receiving node in the system performs the steps in FIG. 8.

As discussed above, in one or more embodiments of the invention, the present node may belong to multiple arbitration domains as a receiving node. Each arbitration domain may be associated with a series of time slots for data transmission. Further, the present node may include multiple destination counters, each destination counter corresponding to one of the mentioned arbitration domains.

Initially, in Step 805, it is determined whether the present timeslot for the present arbitration domain matches a recorded value of the destination counter corresponding to the present arbitration domain. As discussed above, values of the destination counter may be recorded in a receiving timeslot list in the present node. When a match exists, the process proceeds to Step 810. However, when no match is found, the process proceeds to Step 815.

In Step 810, the receiving node activates an input switch or a series of input switches (e.g., as described above in reference to FIG. 1 and FIG. 2) associated with the present arbitration domain to receive data during the present timeslot from the sending node.

In Step 815, it is determined whether additional timeslots exist. When it is determined that additional timeslots exist, the process proceeds to Step 820 for the next timeslot before returning to Step 805. When it is determined that no more timeslots exist, the process ends. In one or more embodiments of the invention, Step 815 is omitted. In such embodiments, Step 820 is immediately executed after Step 805 and/or Step 810.

FIGS. 9A-9E show one or more examples in accordance with one or more embodiments of the invention. The following examples are for explanatory purposes only and are not intended to limit the scope of the invention.

Figure 9A:
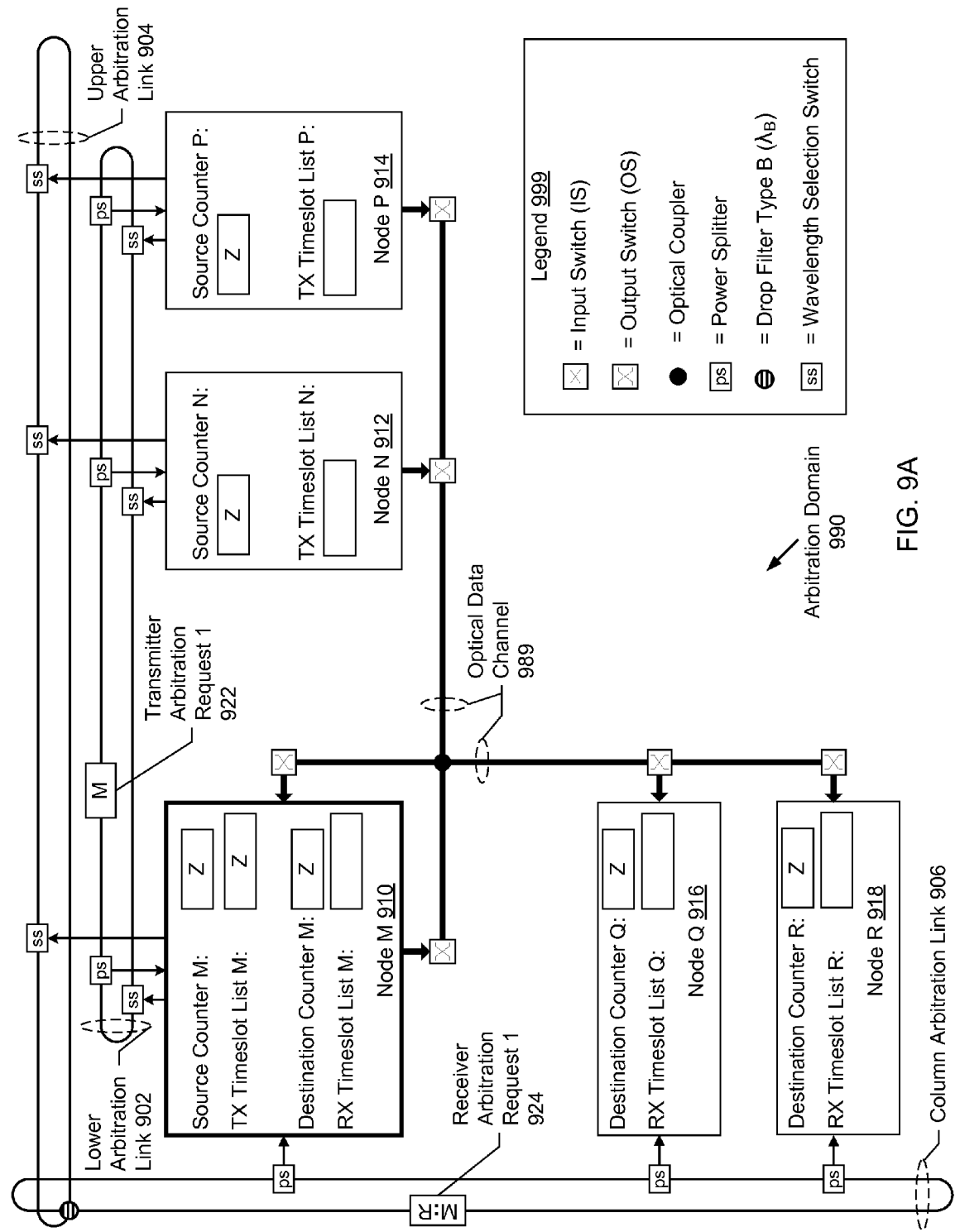
FIGS. 9A-9F show one or more examples in accordance with one or more embodiments of the invention.

FIG. 9A shows an arbitration domain (990) in accordance with one or more embodiments of the invention. As shown in FIG. 9A, the arbitration domain (990) includes multiple sending nodes (i.e., Node M (910), Node N (912), Node P (914)) and multiple receiving nodes (i.e., Node M (910), Node Q (916), Node R (918)). Each of the sending nodes is operatively connected to an optical data channel (989) by an output switch. Similarly, each of the receiving nodes is operatively connected to the optical data channel (989) by an input switch. At any given time, only one of the output switches can be placing (i.e., feeding) optical signals from a sending node onto the optical data channel (989). At any given time, only one of the input switches can be directing optical signals from the optical data channel (989) to a receiving node.

As also shown in FIG. 9A, each sending node includes a source counter (i.e., Source Counter M, Source Counter N, and Source Counter P). The source counter indicates the next available timeslot for transmitting a data item between a sending node and a receiving node. Each sending node also includes a transmission (TX) timeslot list (i.e., TX Timeslot List M, TX Timeslot List N, TX Timeslot List P). A TX timeslot list records the upcoming timeslot(s) during which the sending node having the TX timeslot list is entitled to transmit one or more data items (i.e., timeslots allocated to the sending node). Similarly, each receiving node includes a destination counter (i.e., Destination Counter M, Destination Counter Q, Destination Counter R). Like the source counters, the destination counters indicate the next available (i.e., non-allocated) upcoming timeslot for receiving data from a sending node. Further, each receiving node also includes a receiving (RX) timeslot list (i.e., RX Timeslot List M, RX Timeslot List Q, RX Timeslot List R). A RX timeslot list records the upcoming timeslot(s) during which the receiving node having the RX timeslot list will be the receiving one or more data items from a sending node.

Still referring to FIG. 9A, all the sending nodes are connected to a lower arbitration link (902). Specifically, the sending nodes place transmitter arbitration requests (e.g., Transmitter Arbitration Request 1 (922)) on the lower arbitration link (902) using one or more wavelength selection switches. Further, the sending nodes receive transmitter arbitration requests from the lower arbitration link (902) using one or more power splitters. All the sending nodes are also connected to an upper arbitration link (904). Specifically, the sending nodes place receiver arbitration requests (e.g., Receiver Arbitration Request 1 (924)) on the upper arbitration link (904) using one or more wavelength selection switches.

As shown in FIG. 9A, all the receiving nodes are connected to a column arbitration link (906). Specifically, the receiving nodes receive receiver arbitration requests (e.g., Receiver Arbitration Request 1 (924)) from the column arbitration link (906) using one or more power splitters. The upper arbitration link (904) and the column arbitration link (906) are connected by a drop filter. The lower arbitration link (902), the upper arbitration link (904), and the column arbitration link (906) are all optical arbitration links. Moreover, the lower arbitration link (902), the upper arbitration link (904), and the column arbitration link (906) are essentially the same as the lower arbitration link X (52), the upper arbitration link X (51), and the column arbitration link Q (57), respectively, discussed above in reference to FIG. 3.

The legend (999) includes the symbols used to denote an input switch, an output switch, an optical coupler, a power splitter, a drop filter, and a wavelength selection switch in the example(s).

In the example, FIG. 9A is a snapshot of the arbitration domain (990) during arbitration interval $t_0$. The node M (910) is selected from the multiple sending nodes for the arbitration interval $t_0$ according to a round robin scheme. This selection is denoted by a thick black border outlining the node M (910). Assume the node M (910) has a data item for transmission to node R (918). As shown by the source counters and destination counters in the FIG. 9A, the next available timeslot is timeslot Z. Accordingly, the node M (910) records an indication of timeslot Z in the TX timeslot list M. Further, the node M (910) broadcasts an optical signal representing/carrying the transmitter arbitration request 1 (922) on the lower arbitration request. As the transmitter arbitration request 1 (922) is issued by the node M (910), the transmitter arbitration request 1 (922) in FIG. 9A is labeled with an "M." Further still, the node M (910) broadcasts an optical signal representing/carrying the receiver arbitration request 1 (924) on the upper arbitration link. As the receiver arbitration request 1 (924) is issued by the node M (910), and as the receiving node for the data item is to be the node R (918), the receiver arbitration request 1 (924) in FIG. 9A is labeled with "M:R." The receiver arbitration request 1 (924) is broadcasted on the upper arbitration link (904) using an optical signal having a wavelength of $\lambda_B$. Accordingly, the optical signal carrying/representing the receiver arbitration request 1 (924) will be dropped by the drop filter from the upper arbitration link (904) onto the column arbitration link (906).

Figure 9B:
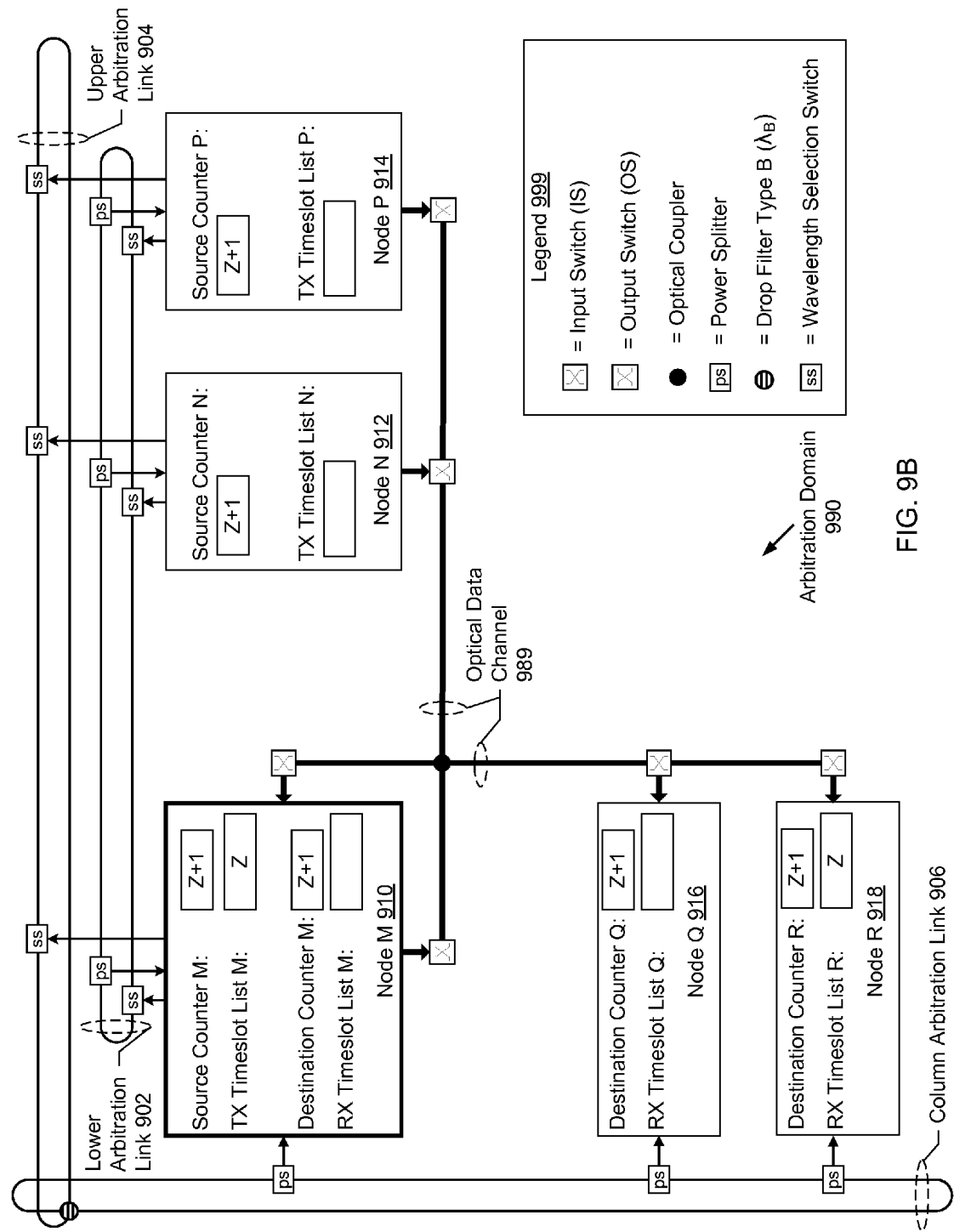

FIG. 9B is a snapshot of the arbitration domain (990) during the arbitration interval $t_0$. In FIG. 9B, the transmitter arbitration request 1 (922), discussed above in reference to FIG. 9A, has been received by all sending nodes. Accordingly, all the source counters have been incremented from "Z" to "Z+1". Further, the receiver arbitration request 1 (924), discussed above in reference to FIG. 9A, has been received by all receiving nodes. In response to receiving the receiver arbitration request 1 (924), destination counter M and destination counter Q increment from "Z" to "Z+1." As the receiver arbitration request 1 (924) identifies the node R (918) as the node to receive data from the sending node M (910), the value of the destination counter R (i.e., "Z") is recorded in the RX timeslot list R before the destination counter R is incremented from "Z" to "Z+1."

Figure 9C:
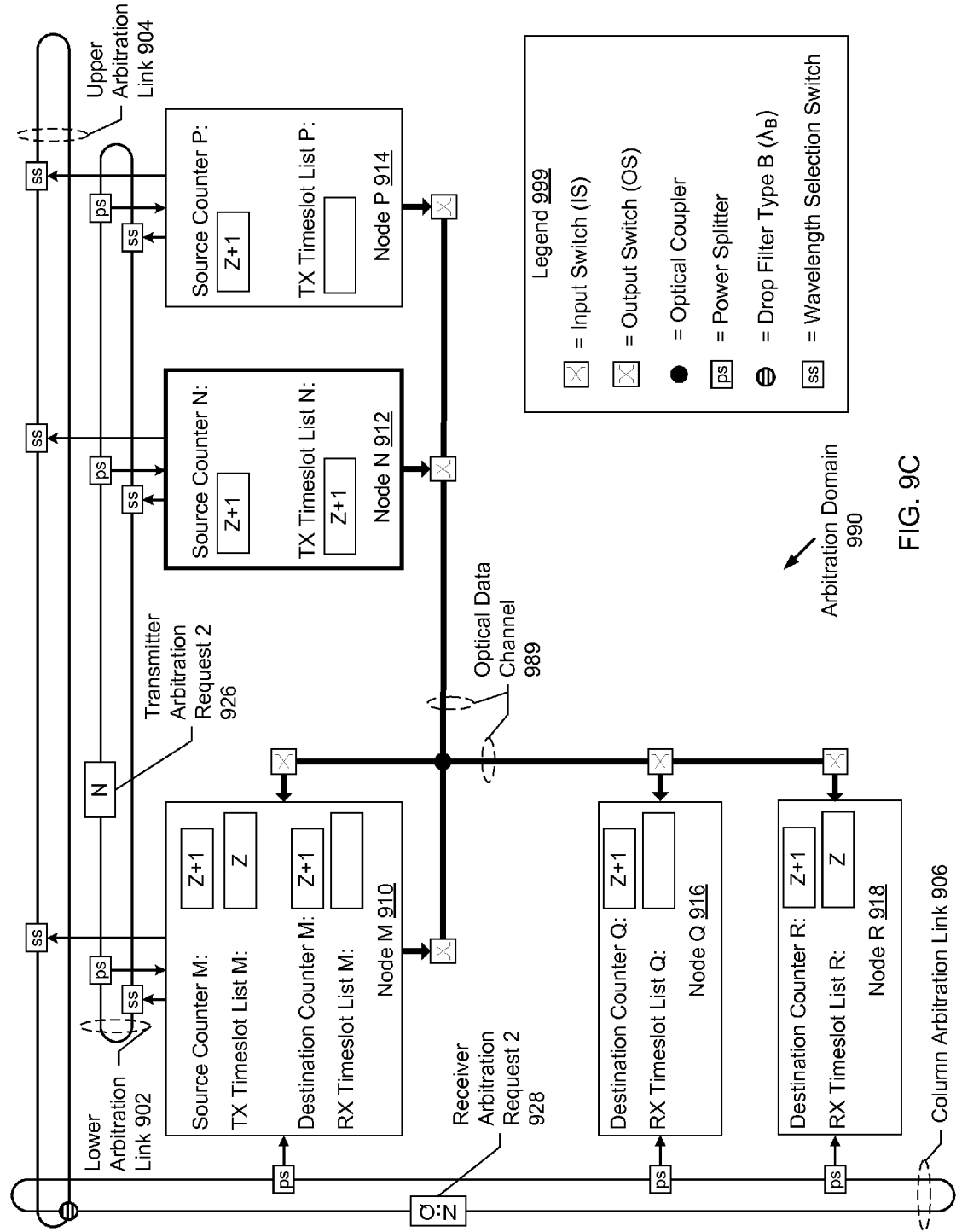

FIG. 9C is a snapshot of the arbitration domain (990) during arbitration interval $t_1$. The arbitration interval $t_1$ occurs after the arbitration interval $t_0$ (i.e., the arbitration interval $t_0$ and the arbitration interval $t_1$ are consecutive arbitration intervals). The node N (912) is selected from the multiple sending nodes for the arbitration interval $t_1$ according to the round robin scheme. This selection is denoted by a thick black border outlining the node N (912). Assume the node N (912) has a data item for transmission to node Q (916). As shown by the source counters and destination counters in the FIG. 9C, the next available timeslot is timeslot Z+1. Accordingly, the node N (912) records an indication of the timeslot Z+1 in the TX timeslot list N. Further, the node N (912) broadcasts an optical signal representing/carrying the transmitter arbitration request 2 (926) on the lower arbitration request. As the transmitter arbitration request 2 (926) is issued by the node N (912), the transmitter arbitration request 2 (926) in FIG. 9C is labeled with an "N." Further still, the node N (912) broadcasts an optical signal representing/carrying the receiver arbitration request 2 (928) on the upper arbitration link. As the receiver arbitration request 2 (928) is issued by the node N (912), and as the receiving node for the data item is to be the node Q (916), the receiver arbitration request 2 (928) in FIG. 9C is labeled with "N:Q." The receiver arbitration request 2 (928) is broadcasted on the upper arbitration link (904) using an optical signal having a wavelength of $\lambda_B$. Accordingly, the optical signal carrying/representing the receiver arbitration request 2 (98) will be dropped by the drop filter from the upper arbitration link (904) onto the column arbitration link (906).

Figure 9D:
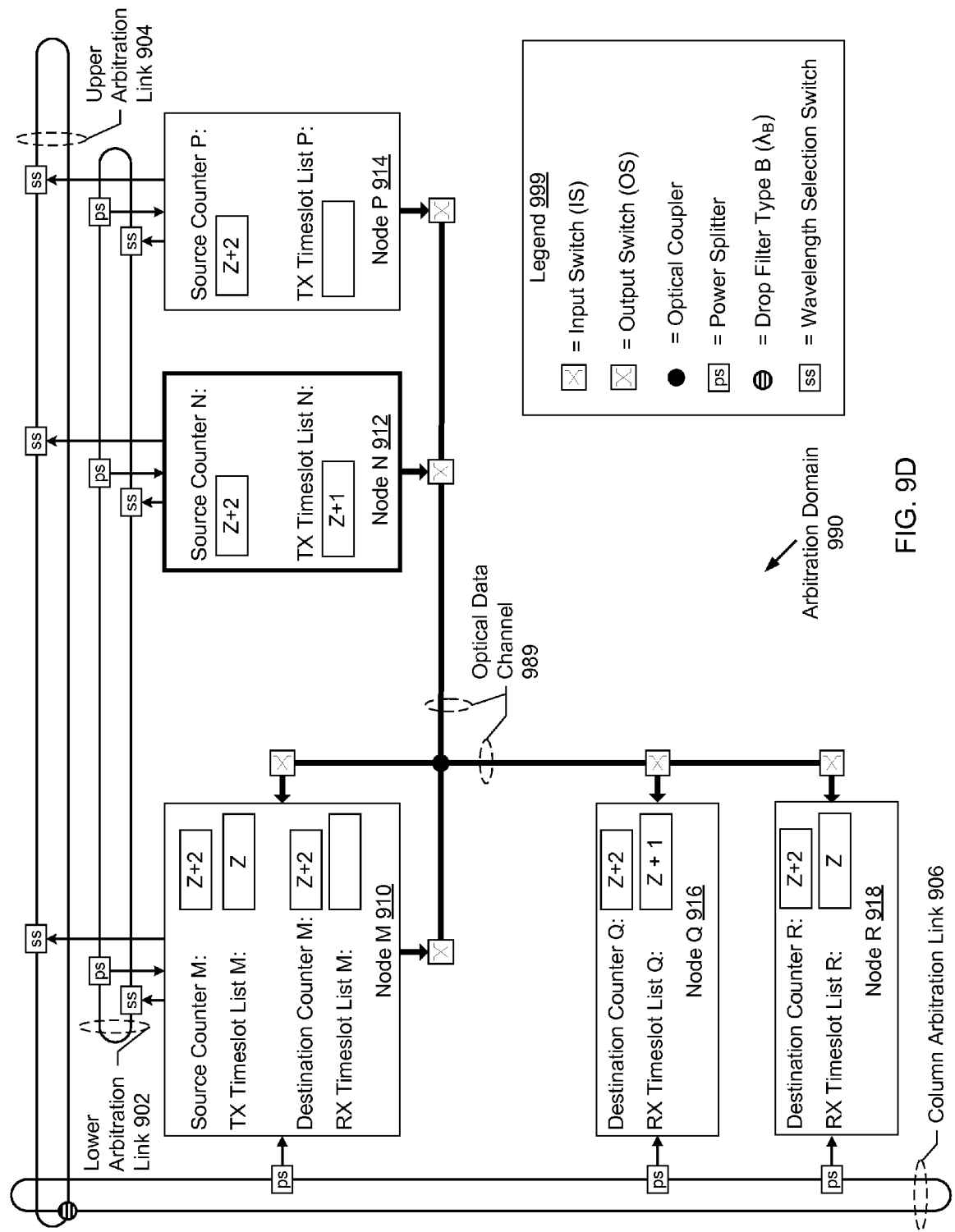

FIG. 9D is a snapshot of the arbitration domain (990) during the arbitration interval $t_1$. In FIG. 9D, the transmitter arbitration request 2 (926), discussed above in reference to FIG. 9C, has been received by all sending nodes. Accordingly, all the source counters have been incremented from "Z+1" to "Z+2." Further, the receiver arbitration request 2 (928), discussed above in reference to FIG. 9C, has been received by all receiving nodes. In response to receiving the receiver arbitration request 2 (928), destination counter M and destination counter R increment from "Z+1" to "Z+2." As the receiver arbitration request 2 (928) identifies the node Q (916) as the receiving node to receive data from the sending node N (912), the value of the destination counter Q (i.e., "Z+1") is recorded in the RX timeslot list Q before the destination counter Q is incremented from "Z+1" to "Z+2."

Figure 9E:
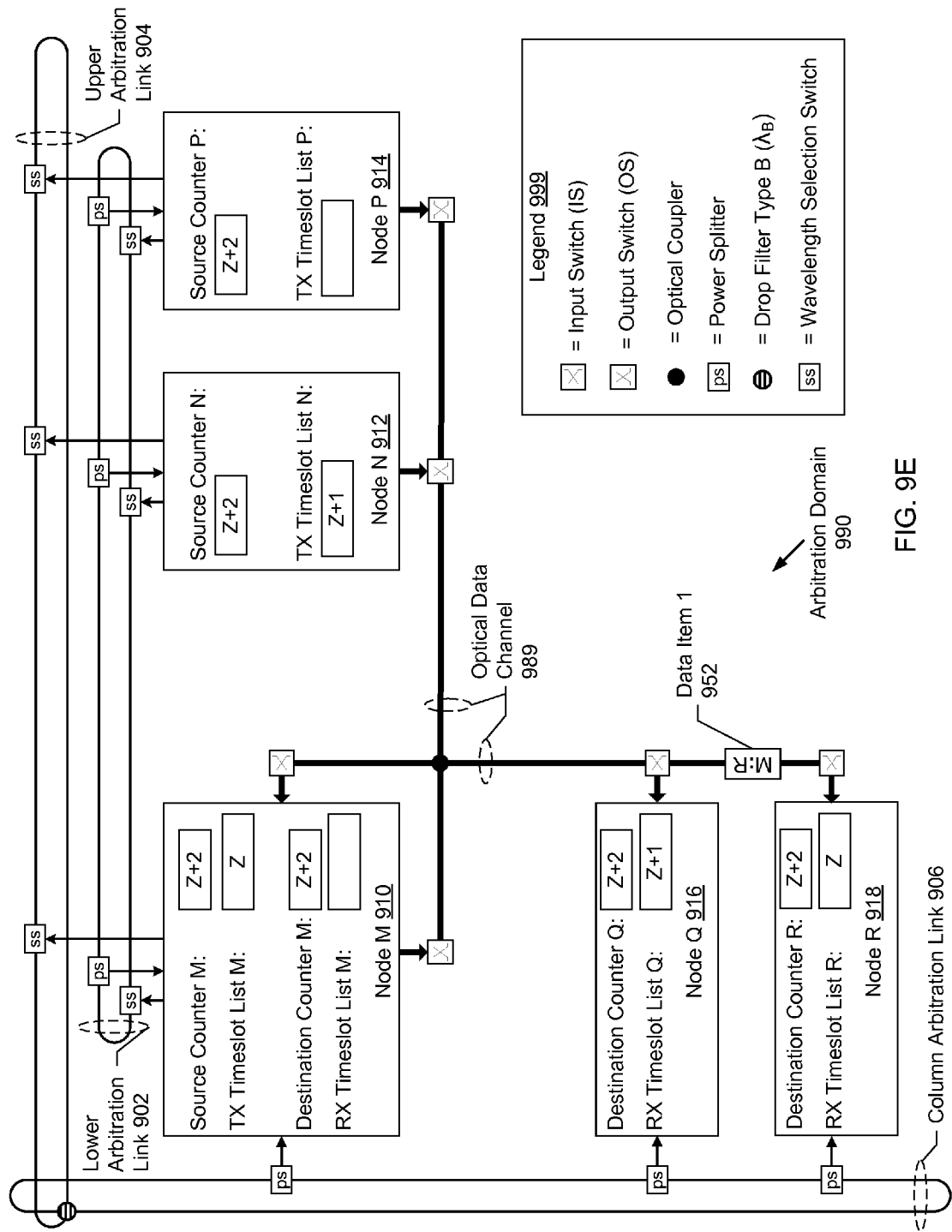

FIG. 9E is a snapshot of the arbitration domain (990) during the timeslot Z.

As the TX timeslot list M includes an indication of the timeslot Z, the node M (910) activates the output switch connecting the node M (910) with the optical data channel (989). As the TX timeslot list N and the TX timeslot P do not include an indication of the timeslot Z, the output switches connecting the node N (912) and the node P (914) with the optical data channel (989) are not activated during timeslot Z. Similarly, as the RX timeslot list R includes an indication of the timeslot Z, the node R (918) activates the input switch connecting the node R (918) with the optical data channel (989). However, as the RX timeslot list M and the RX timeslot list Q do not include an indication of the timeslot Z, the input switches connecting the node M (910) and the node Q (916) with the optical data channel (989) are not activated during timeslot Z. During timeslot Z, the data item 1 (952) is transmitted from the node M (910) to the node R (918) using the output switch connecting the node M (910) to the optical data channel, the optical coupler, and the input switch connecting the node R (918) to the optical data channel. As the data item 1 (952) is sent by the node M (910) and destined for the node R (918), the data item 1 (952) in FIG. 9E is labeled with "M:R." Upon completion of the timeslot Z, or when only a predetermined amount of time remains in timeslot Z, the sending node M (910) deactivates its output switch and the receiving node R (918) deactivates its input switch.

Figure 9F:
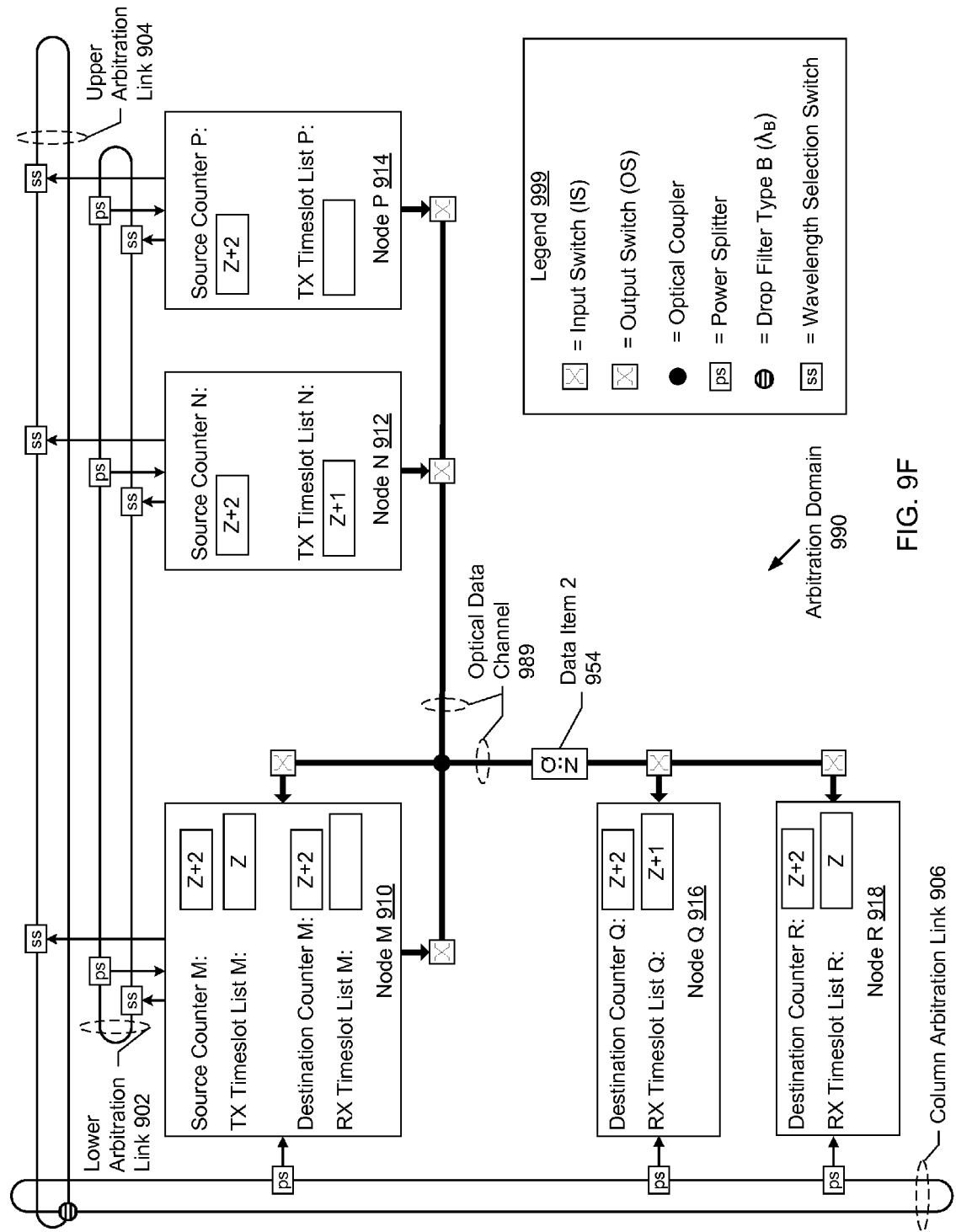

FIG. 9F is a snapshot of the arbitration domain (990) during the timeslot Z+1. As the TX timeslot list N includes an indication of the timeslot Z+1, the node N (912) activates the output switch connecting the node N (912) with the optical data channel (989). As the TX timeslot list M and the TX timeslot P do not include an indication of the timeslot Z+1, the output switches connecting the node M (910) and the node P (914) with the optical data channel (989) are not activated during timeslot Z+1. Similarly, as the RX timeslot list Q includes an indication of the timeslot Z+1, the node Q (916) activates the input switch connecting the node Q (916) with the optical data channel (989). However, as the RX timeslot list M and the RX timeslot list R do not include an indication of the timeslot Z+1, the input switches connecting the node M (910) and the node R (918) with the optical data channel (989) are not activated during timeslot Z+1. During timeslot Z+1, the data item 2 (954) is transmitted from the node N (912) to the node Q (916) using the output switch connecting the node N (912) with the optical data channel, the optical coupler, and the input switch connecting the node Q (916) with the optical data channel. As the data item 2 (954) is sent by the node N (912) and destined for the node Q (916), the data item 2 (954) in FIG. 9F is labeled with "N:Q." Upon completion of the timeslot Z+1, or when only a predetermined amount of time remains in timeslot Z+1, the sending node N (912) deactivates it's the output switch and the receiving node Q (916) deactivates its input switch.

Figure 10:
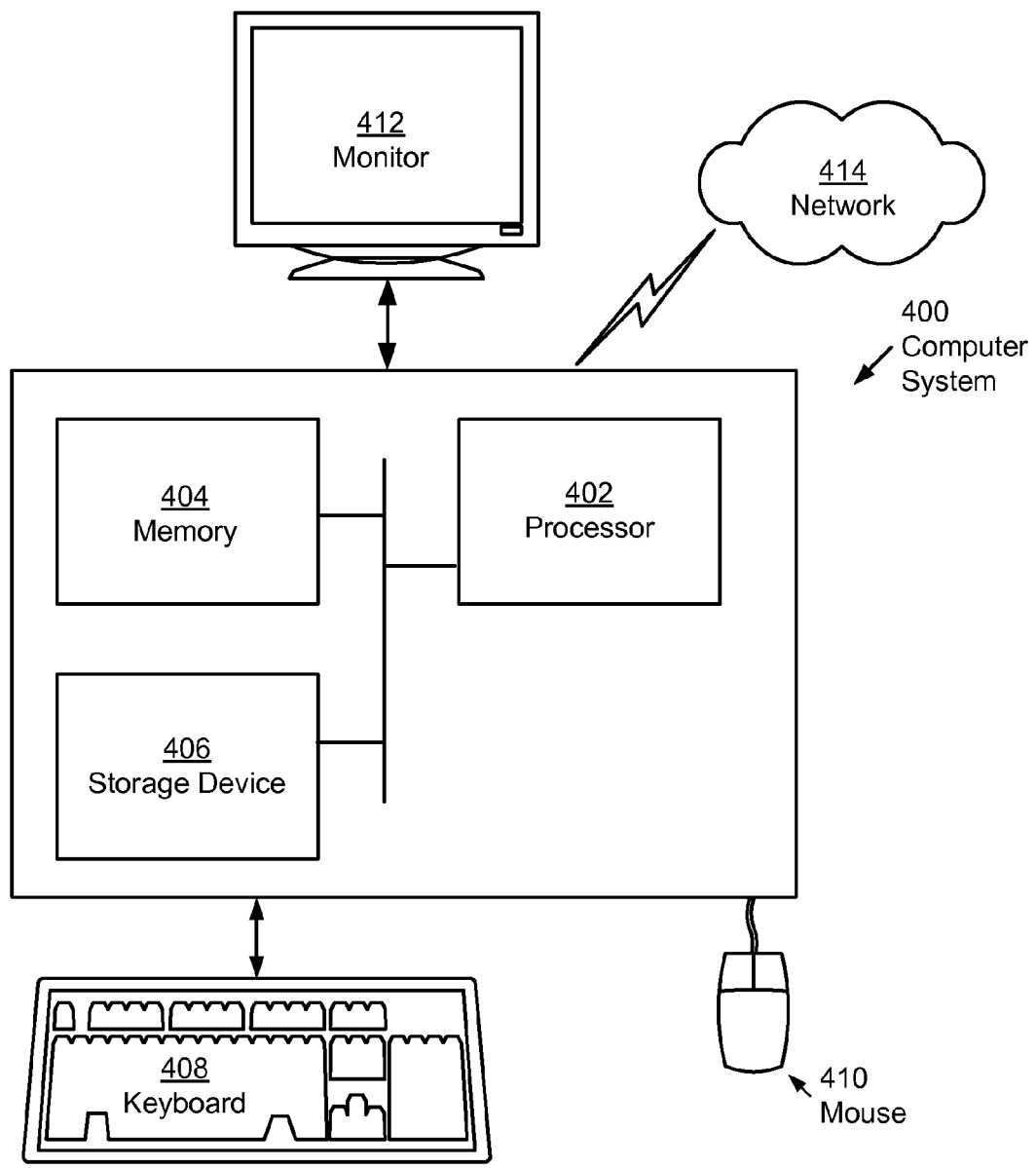
FIG. 10 shows a computer system in accordance with one or more embodiments of the invention.

Embodiments of the invention may be implemented on virtually any type of computer regardless of the platform being used. For example, as shown in FIG. 10, a computer system (400) includes one or more processor(s) (402) (such as a central processing unit (CPU), integrated circuit, etc.), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for arbitration, comprising:
    selecting, for an arbitration interval corresponding to a timeslot, a sending node from a plurality of sending nodes in an arbitration domain, wherein the plurality of sending nodes comprises a plurality of source counters;
    broadcasting, by the sending node and in response to selecting the sending node, a transmitter arbitration request for the timeslot during the arbitration interval;
    recording a value of a source counter in the sending node to generate a recorded value of the source counter;
    receiving, by the plurality of sending nodes, the transmitter arbitration request;
    incrementing the plurality of source counters in response to receiving the transmitter arbitration request;
    identifying, by the sending node and after completion of the arbitration interval, the timeslot by comparing the recorded value of the source counter with a clock signal; and
    sending, during the timeslot, a data item from the sending node to a receiving node via an optical data channel.

2. The method of claim 1, wherein the sending node is selected from the plurality of sending nodes based on a round robin scheme.

3. The method of claim 1, wherein broadcasting the transmitter arbitration request comprises:
    sending, from the sending node, an optical signal to an optical arbitration link (OAL) using at least one selected from a wavelength selection switch,
    wherein the optical signal corresponds to the transmitter arbitration request, and
    wherein the OAL is connected to the plurality of sending nodes using a plurality of power splitters.

4. The method of claim 1, further comprising:
    broadcasting, by the sending node, a receiver arbitration request for the timeslot during the arbitration interval;
    receiving, by a plurality of receiving nodes including the receiving node, the receiver arbitration request, wherein the plurality of receiving nodes comprises a plurality of destination counters; and
    activating, by the receiving node and during the timeslot, an input switch controlled by the receiving node and linking the sending node and the receiving node.

5. The method of claim 4, further comprising:
    recording, by the receiving node and in response to receiving the receiver arbitration request, a value of a destination counter in the receiving node to generate a recorded value of the destination counter; and
    identifying, by the receiving node and after completion of the arbitration interval, the timeslot by comparing the recorded value of the destination counter with a clock signal.

6. The method of claim 4, further comprising:
    incrementing, in response to receiving the receiver arbitration request, the plurality of destination counters,
    wherein the input switch operatively connects the receiving node with the optical data channel.

7. The method of claim 4, further comprising:
    incrementing, in response to receiving the receiver arbitration request, the destination counter in the receiving node; and
    selecting, by the receiving node and based on the sending node, the input switch from a series of input switches controlled by the receiving node,
    wherein the input switch operatively connects the sending node with the optical data channel.

8. The method of claim 4, wherein broadcasting the receiver arbitration request comprises:
    identifying a drop filter connecting a first optical arbitration link (OAL) and a second OAL link, wherein the plurality of receiving nodes are connected to the second OAL using a plurality of power splitters; and
    sending, from the sending node using a wavelength of the drop filter, an optical signal to the first OAL,
    wherein the optical signal corresponds to the receiver arbitration request, and
    wherein the drop filter is configured to reroute the optical signal from the first OAL to the second OAL.

9. A system for arbitration, comprising:
    a sending node selected from a plurality of sending nodes having a plurality of source counters, wherein the sending node is configured to broadcast a transmitter arbitration request and a receiver arbitration request during an arbitration interval;
    a receiving node having a destination counter and configured to receive a data item from the sending node during a timeslot corresponding to the arbitration interval and commencing after completion of the arbitration interval;
    an optical data channel configured to propagate the data item between the sending node and the receiving node;
    a first optical arbitration link (OAL) configured to propagate the transmitter arbitration request to the plurality of sending nodes;
    a second OAL configured to propagate the receiver arbitration request from the sending node; and
    a third OAL operatively connected to the second OAL and configured to propagate the receiver arbitration request to the receiving node,
    wherein the plurality of source counters increment in response to the plurality of sending nodes receiving the transmitter arbitration request, and
    wherein the destination counter increments in response to the receiving node receiving the receiver arbitration request.

10. The system of claim 9, further comprising a drop filter connecting the second OAL and the third OAL.

11. The system of claim 9, further comprising a plurality of power splitters connecting the first OAL and the plurality of sending nodes.

12. The system of claim 9, wherein the transmitter arbitration request comprises a column identification of the sending node.

13. The system of claim 9, further comprising a wavelength selection connecting the sending node and the first OAL.

14. The system of claim 9, further comprising a grid including a first row having the plurality of sending nodes and a second row having the receiving node, wherein the receiver arbitration request comprises an identification of the second row.

15. The system of claim 9, further comprising:
    a series of input switch connecting the receiving node with the optical data channel, wherein the receive node activates a switch of the series of switches during the timeslot, and an output switch connecting the sending node with the optical data channel, wherein the sending node activates the output switch during the timeslot.

16. A macrochip comprising:
a sending node selected from a plurality of sending nodes having a plurality of source counters, wherein the sending node is configured to broadcast a transmitter arbitration request and a receiver arbitration request during an arbitration interval;
a receiving node having a destination counter and configured to receive a data item from the sending node during a timeslot corresponding to the arbitration interval and commencing after completion of the arbitration interval; and
a silicon photonic network (SPN) configured to propagate the transmitter arbitration to the plurality of sending nodes, the receiver arbitration request to the receiving node, and the data item to the receiving node,
wherein the plurality of source counters increment in response to the plurality of sending nodes receiving the transmitter arbitration request, and
wherein the destination counter increments in response to the receiving node receiving the receiver arbitration request.

17. The macrochip of claim 16, wherein the SPN comprises:
an optical arbitration link (OAL) operatively connected to the plurality of sending nodes using a plurality of power splitters and configured to propagate the transmitter arbitration request to the plurality of sending nodes.

18. The macrochip of claim 17, wherein the sending node is operatively connected to the OAL using a wavelength selection switch.

19. The macrochip of claim 16, wherein the SPN comprises:
a first OAL configured to propagate the receiver arbitration request from the sending node; and
a second OAL operatively connected to the first OAL using a drop filter and configured to propagate the receiver arbitration request to the receiving node,
wherein the receiving node is operatively connected to the second OAL using a power splitter.

* * * * *